(12) United States Patent
Korenaga et al.

(10) Patent No.: US 6,904,190 B2
(45) Date of Patent: Jun. 7, 2005

(54) OPTICAL PACKAGE SUBSTRATE, OPTICAL DEVICE, OPTICAL MODULE, AND METHOD FOR MOLDING OPTICAL PACKAGE SUBSTRATE

(75) Inventors: Tsuguhiro Korenaga, Katano (JP); Nobuki Itoh, Kitakatsuragi-gun (JP); Masaaki Tojo, Kitakatsuragi-gun (JP); Toshihiko Wada, Katano (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 26 days.

(21) Appl. No.: 10/308,007

(22) Filed: Dec. 3, 2002

(65) Prior Publication Data

US 2003/0118294 A1 Jun. 26, 2003

(30) Foreign Application Priority Data

Dec. 4, 2001 (JP) ...................................... 2001-370149
Dec. 4, 2001 (JP) ...................................... 2001-370150

(51) Int. Cl.⁷ ............................................... G02B 6/12
(52) U.S. Cl. .......................................... 385/14; 385/52
(58) Field of Search ........................... 385/2, 8, 14, 15, 385/49–52, 94

(56) References Cited

U.S. PATENT DOCUMENTS

| 4,079,404 | A | * | 3/1978 | Comerford et al. ........... 372/50 |
| 4,750,799 | A | * | 6/1988 | Kawachi et al. .............. 385/14 |
| 5,761,234 | A | * | 6/1998 | Craig et al. .................... 372/75 |
| 5,854,867 | A | * | 12/1998 | Lee et al. ...................... 385/49 |
| 6,207,950 | B1 | * | 3/2001 | Verdiell ........................ 250/239 |
| 6,227,724 | B1 | * | 5/2001 | Verdiell ........................ 385/91 |
| 6,324,318 | B1 | * | 11/2001 | Suzuki .......................... 385/24 |
| 6,330,388 | B1 | * | 12/2001 | Bendett et al. ............. 385/132 |
| 6,343,171 | B1 | * | 1/2002 | Yoshimura et al. ........... 385/50 |
| 6,363,185 | B2 | * | 3/2002 | Shekel et al. ................. 385/33 |
| 6,400,490 | B1 | * | 6/2002 | Hosoi ........................... 359/254 |
| 6,584,250 | B2 | * | 6/2003 | Lin et al. ...................... 385/52 |

FOREIGN PATENT DOCUMENTS

| JP | 57029022 A | * | 2/1982 | ............ G02B/7/26 |
| JP | 9-54222 | | 2/1997 | |
| JP | 2000-275478 | | 10/2000 | |
| JP | 2001-21771 | | 1/2001 | |
| JP | 2001-54808 | | 2/2001 | |

OTHER PUBLICATIONS

Takeo Sato, "Three Dimensional Processing by Micro Electro–Discharge Machining," Journal of JSPE (The Japan Society for Precision Engineering), vol. 61, No. 10, pp. 1369–1372 (1995), *no translation.

"Three–Dimensional Micromachining With Precision on the Order of Subnicrons—Ultra–Micro Discharge Machine", Optical Alliance, 1995, 3, pp. 28–31, *no translation.

* cited by examiner

*Primary Examiner*—William H. Mayo
*Assistant Examiner*—Adolfo Nino
(74) *Attorney, Agent, or Firm*—Wenderoth, Lind & Ponack, L.L.P.

(57) ABSTRACT

Micro-discharge machining is employed to obtain a die, and an optical package substrate is produced by press formation using such a die. An optical fiber, an optical waveguide, a lens, an isolator, an optical filter and a light receiving/emitting element are mounted by passive alignment.

48 Claims, 21 Drawing Sheets

F I G. 2
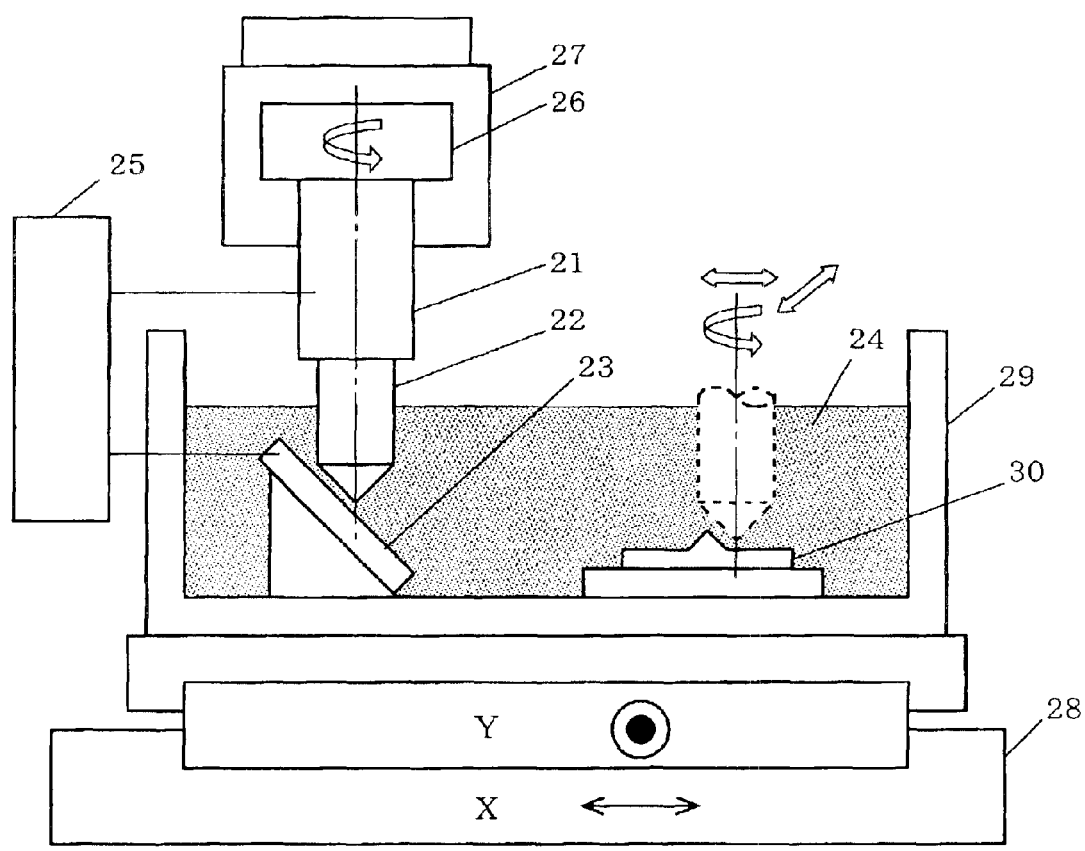

PLAN VIEW

SIDE VIEW

FIG. 20
(a) 
(b) 
(c) 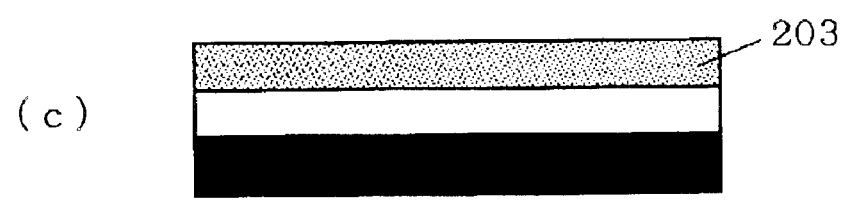
(d) 
(e) 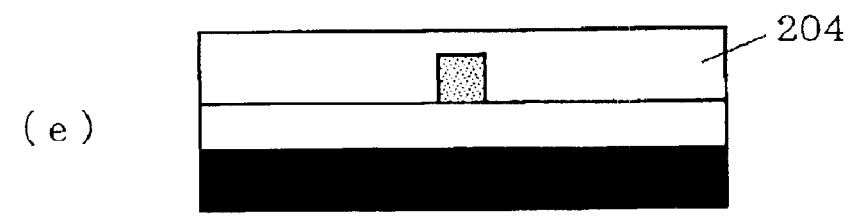

FIG. 21
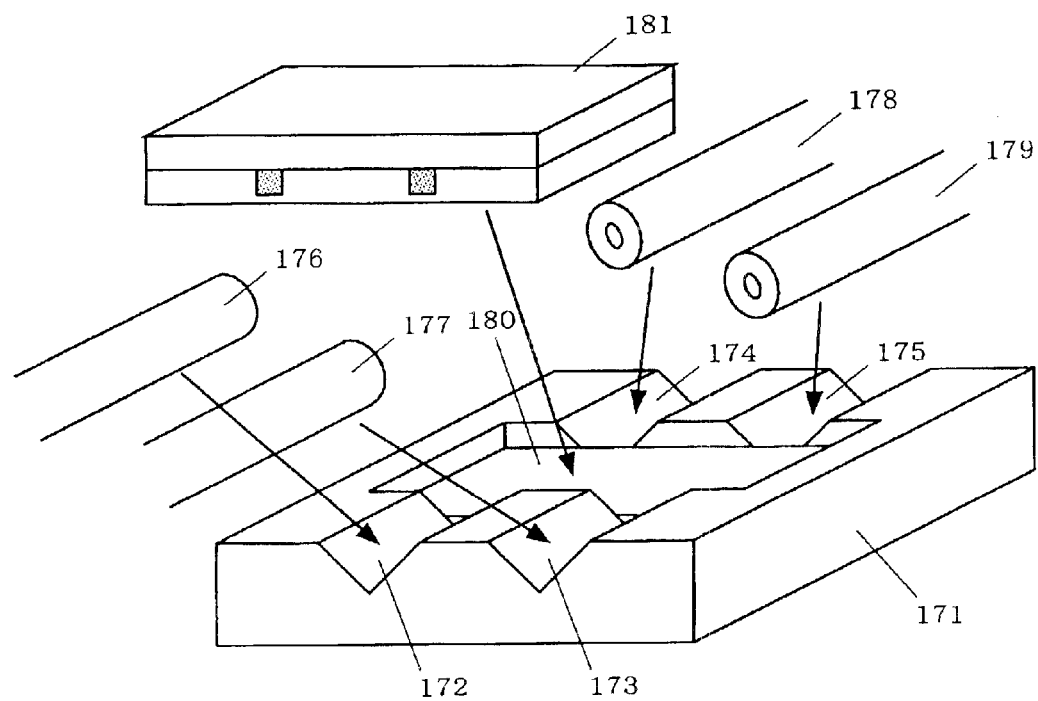
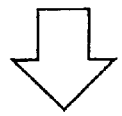
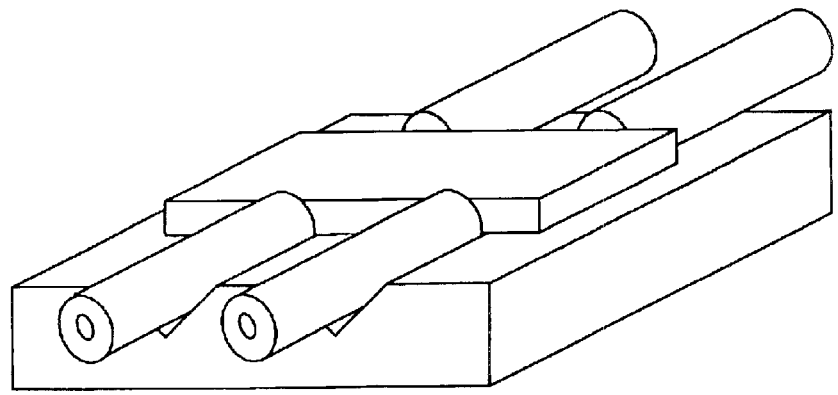

F I G. 2 2
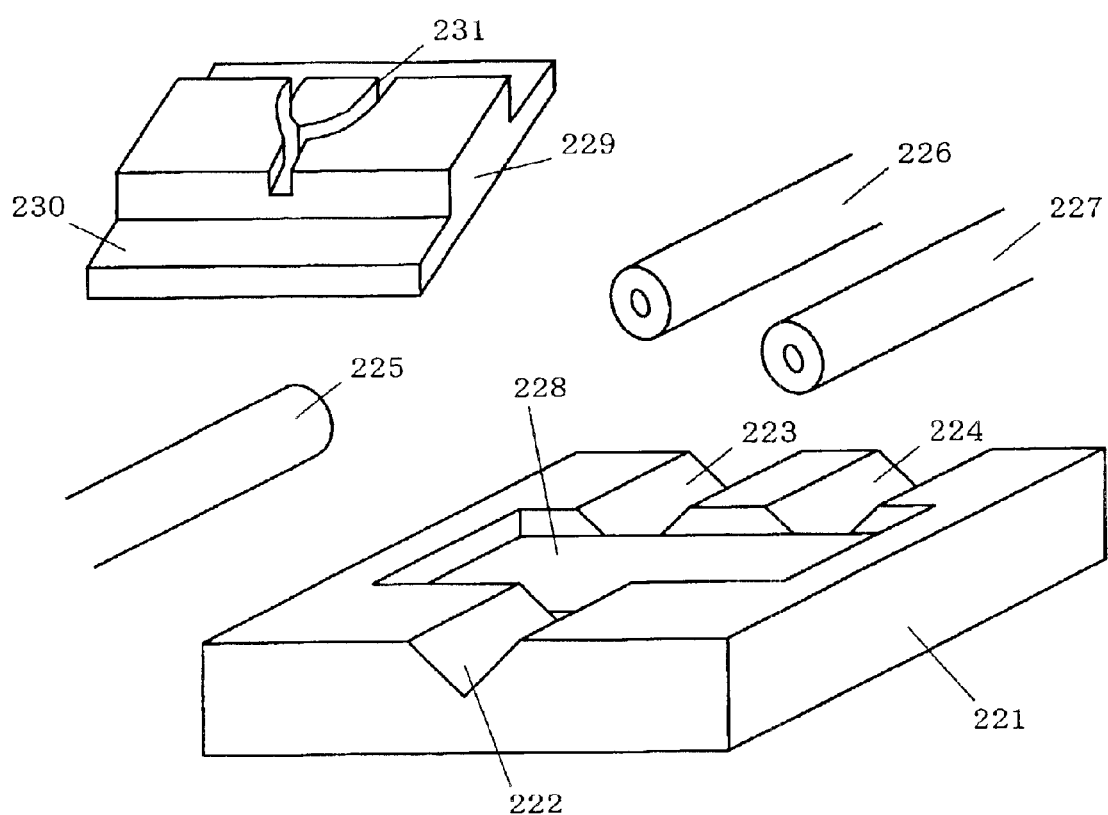

F I G. 2 3
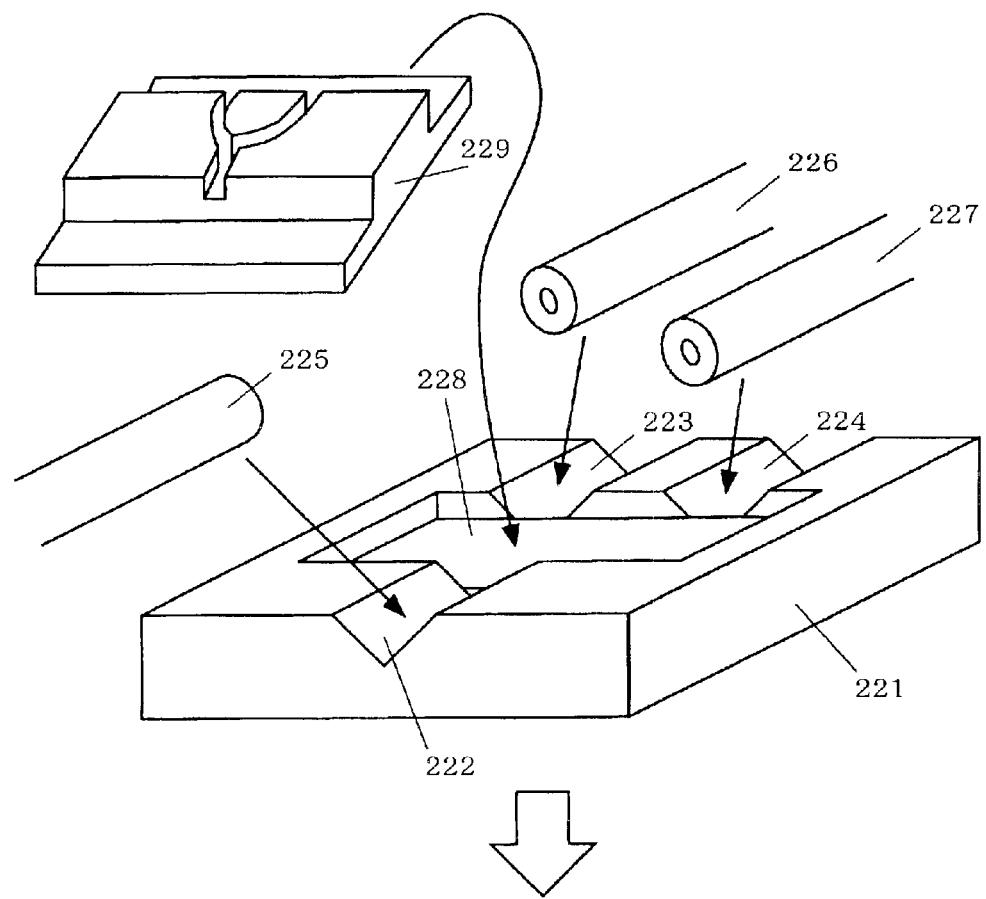
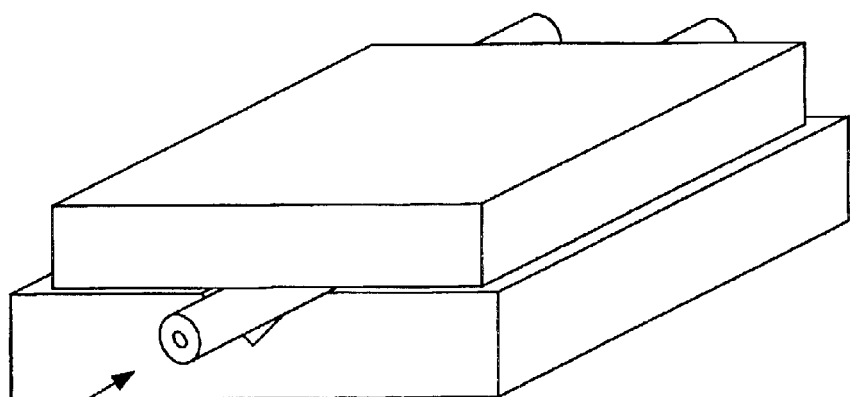
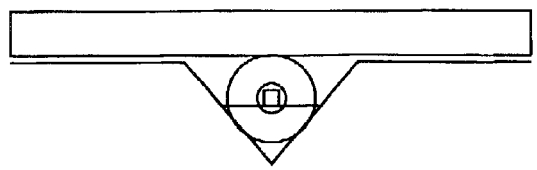
VIEW FROM ARROW

F I G. 2 4
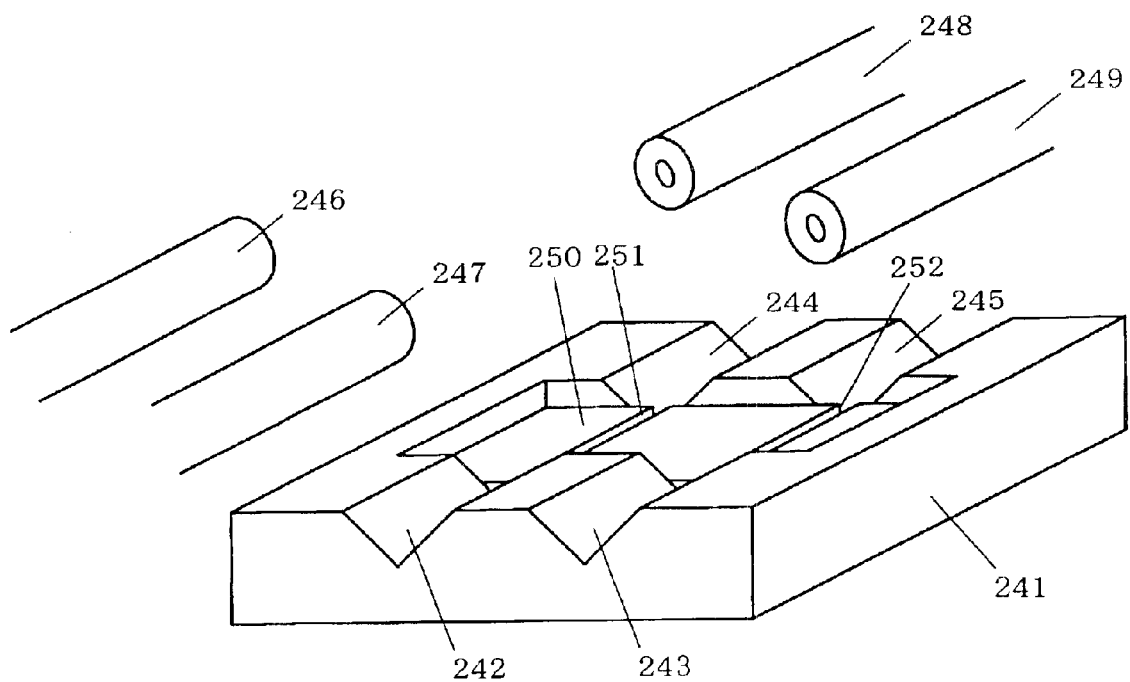

OPTICAL PACKAGE SUBSTRATE, OPTICAL DEVICE, OPTICAL MODULE, AND METHOD FOR MOLDING OPTICAL PACKAGE SUBSTRATE

BACKGROUND OF THE INVENTION

1. Field of the Invention

The present invention relates to an optical package substrate, an optical device, an optical module and a method for molding an optical package substrate. More particularly, the present invention relates to a package substrate having a surface configuration that is suitable for mounting optical components and/or optical elements thereon, and a method for molding the same, and relates also to an optical device and an optical module constructed by employing the package substrate.

2. Description of the Background Art

Optical communication systems employing optical fibers are evolving themselves from conventional long haul communication systems into subscriber communication systems. Subscriber-type optical communication systems require use of small and inexpensive optical devices and optical modules.

In conventional optical devices or optical modules, coaxial alignment has to be ensured between optical components, such as an optical fiber, a lens and an optical waveguide, or between an optical component and an optical element, such as a laser or a photo-diode. Usually, positioning of optical fibers, lenses, and optical waveguides requires high precision, e.g., a tolerance of ±1 $\mu$m. Therefore, a so-called "active alignment" method has been widely employed during an assembly process, in which positions of components are adjusted while driving an optical element to provide laser light and monitoring an amount of light that is being propagated through an optical fiber and optical waveguide. However, this technique requires complicated adjustment tasks, and is time-consuming, thus presenting a substantial cost problem.

On the other hand, so-called passive alignment, in which components are positioned without such adjustment has attracted attention as a technique for simplifying assembly of optical devices and optical modules. In one typical passive alignment technique, an optical module is assembled by using a silicon substrate, which can be wet-etched with high precision (Japanese Patent Laid-Open Publication No. 2001-21771, for example). This technique will now be described with reference to FIG. 26.

Referring to FIG. 26, an optical package substrate 261, which is composed of silicon, includes a guide groove (a so-called "V groove") 262 for mounting an optical fiber 264, a marker 267 for positioning a laser 266, and a guide groove 263 for mounting a lens 265 (a flat micro-lens in the illustrated example) for converging laser light into the optical fiber 264. On the optical package substrate 261, the optical fiber 264 and the lens 265 are affixed to the guide grooves 262 and 263, respectively, and the laser 266 is fixed while being aligned with the marker 267, whereby these members are positioned with respect to one another.

With this conventional configuration, optical coupling efficiency is increased by use of the lens 265, while mounting of the optical fiber 264 and the lens 265 can be simplified. Note that although not shown in FIG. 26, a groove for holding an isolator may be formed between the guide groove 262 and the guide groove 263, whereby an amount of reflected return light to the laser 266 can be reduced.

However, the conventional optical package substrate 261 illustrated in FIG. 26 has the following problems.

The guide groove 262 for positioning an optical fiber can be formed by an anisotropic wet etching process of silicon. This process is based on a phenomenon that the (111) surface of silicon is selectively etched with a liquid etchant whose main component is KOH, and is capable of forming the guide groove 262 with a precise angle by using a patterned $SiO_2$ mask.

However, because a side wall of the guide groove 263 for the lens 265 (or an isolator) extends vertically, but not in an oblique direction as does a V groove, the guide groove 263 is formed by a dicing process instead of a wet etching process. Particularly, since an optical axis of the lens 265 and that of the optical fiber 264 need to be aligned with each other, the guide groove 263 for the lens 265 needs to be formed with high precision on the order of microns with respect to its depth and position, thereby hindering mass-production thereof. Moreover, with a dicing process, the optical package substrate 261 needs to be processed across an entire width thereof in order to obtain a uniform groove depth (see the guide groove 263 in FIG. 26). Therefore, with the optical package substrate 261 illustrated in FIG. 26, it is necessary to actively adjust a position of the lens 265 in a direction perpendicular to the optical axis, i.e., a width direction of the optical package substrate 261. Moreover, the lens 265 that can be mounted on the substrate is limited to a flat lens.

As described above, in a case where a plurality of grooves of different cross-sectional shapes are formed in an optical package substrate made of silicon, it is necessary to perform different types of processes for these differently-shaped grooves.

Another method known in the art is to form a guide groove for fixing an optical fiber in a glass-based optical package substrate, instead of a silicon-based optical package substrate, by using press formation (Japanese Patent Laid-Open Publication No. 9-54222, for example). Note that press formation is a technique known in the art that has already been in practical use as a method for producing an aspheric glass lens. This technique will now be described with reference to FIG. 27.

First, a glass substrate 271 having a terrace (sunken portion) 272 in a center thereof, and a die 273 having a V-shaped protrusion for forming a groove (V groove) for guiding an optical fiber on one surface thereof, are provided ((a) in FIG. 27). Then, the die 273 is pressed against the glass substrate 271, which has been softened by high-temperature heating, thereby forming a guide groove 274 for an optical fiber in the glass substrate 271 ((b) in FIG. 27). During this process, the guide groove is not formed in the terrace 272 of the glass substrate 271. Then, an optical waveguide substrate 275 having an optical waveguide 276 therein is fitted into the terrace 272 of the glass substrate 271. Finally, an optical fiber 277 is affixed to each guide groove 274 ((c) in FIG. 27). Through steps as described above, the optical waveguide 276 and the optical fibers 277 are connected to each other.

Such press formation requires a die made of an ultra-hard alloy, or the like. Materials used in dies for plastic molding, such as electro-formed nickel, cannot be used because press formation of glass requires a die having both a high heat resistance and a high mechanical strength. FIG. 28A and FIG. 28B illustrate a typical, conventional method for forming a die used for molding a V groove. The die is formed by using a micro-grinder, which includes a disc-shaped diamond grindstone 281 whose tip is finished into a V shape, A die 283 as illustrated in FIG. 28B is obtained by grinding a flat ultra-hard alloy 282 from one end thereof with the grindstone 281, as illustrated in FIG. 28A. Then, produced die 283 is pressed against a glass material, which has been softened by heating, thereby transferring an inverted pattern of the die 283 onto the glass material. Thus, substrates having guide grooves (V grooves) formed therein can be mass-produced at low cost.

The method of pressing glass is better than the other method of etching silicon in terms of productivity. In addition, since glass, which is the material of the substrate, transmits UV light therethrough, a UV-curing resin can be used for mounting (fixing) an optical fiber on a package substrate. Therefore, it is possible to simplify and quicken a process of mounting optical components or optical elements.

However, use of a micro-grinder for producing a die for forming a V groove imposes limitations on a variety of die shapes that can be formed. For example, while a protrusion of a V shape can be formed with a disc-shaped grindstone, dies having other complicated shapes cannot be formed with a disc-shaped grindstone. Specifically, in order to obtain the optical package substrate 261 including the lens guide groove 263 near the guide groove 262 by press formation, as illustrated in FIG. 26, it is necessary to provide a die including a V-shaped protrusion for molding the guide groove 262 and a wall-shaped protrusion for molding the guide groove 263. However, when forming the V-shaped protrusion with a micro-grinder, the micro-grinder interferes with the wall-shaped protrusion, thereby preventing the die material from being processed in an intended manner. With a micro-grinder, it is very difficult to form a complicated shape as that in the illustrated example, and it is only possible to produce a die for forming a simple shape (e.g., a substrate with an array of parallel V grooves formed therein).

Thus, with conventional press formation for glass, it is not possible to produce a die having a complicated shape. Therefore, it is only possible to mold optical package substrates for limited applications (e.g., a substrate having V grooves along which optical fibers are placed for providing a connection to another component such as an optical waveguide). Due to such limitations, press formation using a die has not been employed for production of optical package substrates.

When forming the guide groove 274 for the optical fiber 277, as illustrated in FIG. 27, it is necessary to ensure a predetermined positional precision with the optical waveguide (i.e., the terrace 272 formed in the glass substrate 271) with respect to both a horizontal direction and a height (vertical) direction. Specifically, a tolerance of ±1 μm is required for alignment between the die 273 and the glass substrate 271 in the horizontal direction and also for a displacement amount by which the die 273 is pressed into the glass substrate 271 in the height direction, and this stringent tolerance is required every time a molding process is performed.

With the conventional method illustrated in FIG. 27, however, a variety of die shapes that can be formed with a micro-grinder is limited. Therefore, the terrace 272 in which an optical waveguide is positioned, and the guide groove 274 for the optical fiber 277 are formed separately. Specifically, in order to obtain, by press formation, the glass substrate 271 as illustrated in FIG. 27, it is necessary to provide a die including a V-shaped protrusion for molding the guide groove 274 and another protrusion for molding the terrace 272. However, when forming the V-shaped protrusion with a micro-grinder, the micro-grinder interferes with the protrusion for the terrace, thereby preventing the die material from being processed in an intended manner.

Thus, with an optical package substrate produced by a conventional method, it is difficult to ensure a high positional precision with a tolerance as stringent as ±1 μm, which is required for connection between a single-mode optical fiber and an optical waveguide. Therefore, a high production yield cannot be expected in mass production.

SUMMARY OF THE INVENTION

Therefore, an object of the present invention is to produce a die having a complicated shape by using a distinctive method and tool, and to mold optical package substrates in large quantities at low cost by using the die, thereby providing an optical package substrate, an optical device, an optical module and a method for molding an optical package substrate, all with high functionality, high productivity and high economic efficiency.

The present invention has the following features to attain the above object.

A first aspect of the present invention is directed to an optical package substrate for mounting an optical component and/or an optical element thereon, and an optical device using the same.

The optical package substrate of the first aspect comprises: an optical-fiber-positioning first guide section for fixing an optical axis of an optical fiber mounted on the optical package substrate, the first guide section being formed as a groove extending in a surface of the optical package substrate from a predetermined side surface thereof to a predetermined location thereon; and a lens-positioning second guide section for fixing an optical axis of a lens mounted on the optical package substrate so that the optical axis of the lens is aligned with that of the optical fiber, the second guide section being formed as a groove extending in the surface of the optical package substrate from another side surface thereof, opposite to the predetermined side surface, to the predetermined location.

In the optical device using the optical package substrate of the first aspect, the lens is affixed to the second guide section of the optical package substrate, and the optical fiber is affixed to the first guide section while being abutted against the lens.

A second aspect of the present invention is directed to an optical package substrate for mounting an optical component and/or an optical element thereon, and an optical device using the same.

The optical package substrate of the second aspect comprises: an optical-fiber-positioning first guide section for fixing an optical axis of an optical fiber mounted on the optical package substrate, the first guide section being formed as a groove extending in a surface of the optical package substrate from a predetermined side surface thereof to a predetermined location thereon; and a lens-positioning second guide section for fixing an optical axis of a lens mounted on the optical package substrate so that the optical axis of the lens is aligned with that of the optical fiber, the second guide section being formed as a depression in the surface of the optical package substrate.

In the optical device using the optical package substrate of the second aspect, the lens is affixed to the second guide section of the optical package substrate, and the optical fiber is affixed to the first guide section.

According to the first and second aspects, an optical fiber and a lens can be aligned with each other with high precision in a horizontal direction and in a vertical direction. Therefore, light exiting the optical fiber can easily be collimated or converged at a predetermined position. Moreover, the optical device can be produced from the optical package substrate through a very simple process, thereby providing excellent productivity and economy.

A third aspect of the present invention is directed to an optical package substrate for mounting an optical component and/or an optical element thereon, and an optical device using the same.

The optical package substrate of the third aspect comprises: an optical-fiber-positioning first guide section for fixing an optical axis of an optical fiber mounted on the optical package substrate, the first guide section being formed as a groove extending in a surface of the optical package substrate from a predetermined side surface thereof to a predetermined location thereon; and an optical-component-positioning second guide section for fixing an optical axis of an optical component mounted on the optical package substrate so that the optical axis of the optical component is aligned with that of the optical fiber, the second guide section being formed as a depression extending in surface of the optical package substrate in a direction perpendicular to the optical axis of the optical fiber.

In the optical device using the optical package substrate of the third aspect, the optical fiber is affixed to the first guide section of the optical package substrate, and the optical component is affixed to the second guide section.

According to the third aspect, an optical fiber and an optical component can be aligned with each other with high precision in the horizontal direction and in the vertical direction. Therefore, by affixing a filter, an isolator, or the like, as an optical component, to the second guide section (slit groove) whose position, depth and width are constant, it is possible to perform a wavelength separation operation, or the like, for light traveling through the optical fiber affixed to the first guide section (guide groove).

A fourth aspect of the present invention is directed to an optical package substrate for mounting an optical component and/or an optical element thereon, and an optical device using the same.

The optical package substrate of the fourth aspect comprises: an optical-fiber-positioning first guide section for fixing an optical axis of an optical fiber mounted on the optical package substrate, the first guide section being formed as a groove extending in a surface of the optical package substrate from a predetermined side surface thereof to a predetermined location thereon; an optical-component-positioning second guide section for fixing an optical axis of an optical component mounted on the optical package substrate so that the optical axis of the optical component is aligned with that of the optical fiber, the second guide section being formed as a depression extending in the surface of the optical package substrate in a direction perpendicular to the optical axis of the optical fiber; and a lens-positioning third guide section for fixing an optical axis of a lens mounted on the optical package substrate so that the optical axis of the lens is aligned with those of the optical fiber and the optical component, the third guide section being formed as a groove extending in the surface of the optical package substrate.

In the optical device using the optical package substrate of the fourth aspect, the optical fiber is affixed to the first guide section of the optical package substrate, the optical component is affixed to the second guide section, and the lens is affixed to the third guide section.

According to the fourth aspect, optical components, such as optical fibers and optical filters, and optical elements, such as lasers and photo-diodes, can be positioned and fixed with high precision simply by passively arranging these components and elements on an optical package substrate. Thus, light transmitting/receiving modules with these optical components and optical elements mounted thereon can be mass-produced at low cost. Moreover, by providing a filter or an isolator between a light emitting element and an optical fiber coupled thereto, it is possible to suppress reflected return light to the light emitting element and to reduce noise in transmitted light.

In the third and fourth aspects, the optical package substrate may further comprise a stage on the surface of the optical package substrate for positioning a light receiving/emitting element so that an optical axis of the light receiving/emitting element is aligned with those of the optical fiber, the optical component and the lens.

By affixing a light emitting element such as a laser on the stage, light can be input to the optical fiber with high optical coupling efficiency. Alternatively, by affixing a light receiving element such as a photo-diode on the stage, light from the optical fiber can be efficiently received by the photo-diode.

A fifth aspect of the present invention is directed to an optical package substrate for mounting an optical component and/or an optical element thereon, and an optical device using the same.

The optical package substrate of the fifth aspect comprises: an optical-fiber-positioning first guide section for fixing an optical axis of a first optical fiber mounted on the optical package substrate, the first guide section being formed as a groove extending in a surface of the optical package substrate from a predetermined side surface thereof to a predetermined location thereon; an optical-fiber-positioning second guide section for fixing an optical axis of a second optical fiber mounted on the optical package substrate so that the optical axis of the second optical fiber is aligned with that of the first optical fiber, the second guide section being formed as a groove extending in the surface of the optical package substrate from another side surface thereof, opposite to the predetermined side surface, to the predetermined location; an optical-fiber-positioning third guide section for fixing an optical axis of a third optical fiber mounted on the optical package substrate, the third guide section being formed as a groove extending in the surface of the optical package substrate in parallel to the first and second guide sections; and an optical-component-positioning fourth guide section for fixing an optical axis of an optical component mounted on the optical package substrate so that the optical axis of the optical component is aligned with those of the first and second optical fibers, the fourth guide section being formed as a depression extending in the surface of the optical package substrate between the first guide section and the second guide section in a direction perpendicular to the optical axes of the first and second optical fibers.

In the optical device using the optical package substrate of the fifth aspect, the optical component is affixed to the fourth guide section of the optical package substrate, the first optical fiber is affixed to the first guide section while being abutted against the optical component, the second optical fiber is affixed to the second guide section while being abutted against the optical component, and the third optical fiber is affixed to the third guide section.

According to the fifth aspect, an optical fiber and an optical component can be aligned with each other with high precision in the horizontal direction and in the vertical direction. Therefore, in a case where a plurality of optical fibers or optical waveguide core patterns are arranged in parallel to one another, these optical components can be affixed while providing the fourth guide section (slit groove) selectively for some of the optical fibers or optical waveguide core patterns.

A sixth aspect of the present invention is directed to an optical package substrate for mounting an optical component and/or an optical element thereon, and an optical device using the same.

The optical package substrate of the sixth aspect comprises: a waveguide section corresponding to a predetermined optical waveguide core pattern, the waveguide section being formed as a groove extending in a surface of the optical package substrate from a predetermined side surface thereof to a predetermined location thereon; and a lens-positioning guide section for fixing an optical axis of a lens mounted on the optical package substrate so that the optical axis of the lens is aligned with that of an optical waveguide formed in the waveguide section, the guide section being formed as a groove extending in the surface of the optical package substrate from another side surface thereof, opposite to the predetermined side surface, to the predetermined location.

In the optical device using the optical package substrate of the sixth aspect, the lens is affixed to the guide section of the optical package substrate, and the waveguide section is filled with a core material having a higher refractive index than that of the optical package substrate, after which a predetermined substrate is attached to the optical package substrate so as to cover the waveguide section by using an adhesive having a lower refractive index than that of the core material.

According to the sixth aspect, a waveguide section and a lens can be aligned with each other with high precision in the horizontal direction and in the vertical direction. Therefore, it is possible to easily make the waveguide section (waveguide channel) filled with the core material function as an optical waveguide, and light exiting from the optical waveguide can be collimated or converged at a predetermined position. Moreover, the optical device can be produced from the optical package substrate through a very simple process, thereby providing excellent productivity and economy.

A seventh aspect of the present invention is directed to an optical package substrate for mounting an optical component and/or an optical element thereon, and an optical device using the same.

The optical package substrate of the seventh aspect comprises: a waveguide section corresponding to a predetermined optical waveguide core pattern, the waveguide section being formed as a groove extending in a surface of the optical package substrate from a predetermined side surface thereof to a predetermined location thereon; and an optical-component-positioning guide section for fixing an optical axis of an optical component mounted on the optical package substrate so that the optical axis of the optical component is aligned with that of an optical fiber, the guide section being formed as a depression extending in the surface of the optical package substrate in a direction perpendicular to an optical axis of an optical waveguide formed in the waveguide section.

In the optical device using the optical package substrate of the seventh aspect, the optical component is affixed to the guide section of the optical package substrate, and the waveguide section is filled with a core material having a higher refractive index than that of the optical package substrate, after which a predetermined substrate is attached to the optical package substrate so as to cover the waveguide section by using an adhesive having a lower refractive index than that of the core material.

According to the seventh aspect, an optical fiber and an optical component can be aligned with each other with high precision in the horizontal direction and in the vertical direction. Therefore, it is possible to easily perform a wavelength separation operation, or the like, for light propagated through an optical waveguide by making the waveguide section (waveguide channel) filled with the core material function as the optical waveguide, and affixing a filter, an isolator, or the like, as an optical component, to the guide section (slit groove).

In the sixth and seventh aspects, the optical package substrate may further comprise a stage on the surface of the optical package substrate for positioning a light receiving/emitting element so that an optical axis of the light receiving/emitting element is aligned with those of the optical waveguide formed in the waveguide section and the optical component.

By affixing a light emitting element such as a laser on the stage, light can be input to the optical fiber with high optical coupling efficiency. Alternatively, by affixing a light receiving element such as a photo-diode on the stage, light from the optical fiber can be efficiently received by the photo-diode.

An eighth aspect of the present invention is directed to an optical package substrate for mounting an optical component and/or an optical element thereon, and an optical module using the same.

The optical package substrate of the eighth aspect comprises: a waveguide section corresponding to a predetermined optical waveguide core pattern, the waveguide section being formed as a groove extending in a surface of the optical package substrate; an optical-component-positioning first guide section for fixing an optical axis of an optical component mounted on the optical package substrate so that the optical axis of the optical component is aligned with that of an optical waveguide formed in the waveguide section, the first guide section being formed as a depression extending in the surface of the optical package substrate in a direction perpendicular to the optical axis of the optical waveguide formed in the waveguide section; a lens-positioning second guide section for fixing an optical axis of a lens mounted on the optical package substrate so that the optical axis of the lens is aligned with that of the optical waveguide formed in the waveguide section, the second guide section being formed as a groove extending in the surface of the optical package substrate; a first stage for positioning a light emitting element, the first stage being located on the surface of the optical package substrate so that an optical axis of the light emitting element is aligned with that of the optical waveguide formed in the waveguide section; and a second stage for positioning a light receiving element, the second stage being located on the surface of the optical package substrate so that an optical axis of the light receiving element is aligned with that of the optical waveguide formed in the waveguide section.

In the optical module using the optical package substrate of the eighth aspect, an isolator or an optical filter is affixed to the first guide section of the optical package substrate, the lens is affixed to the second guide section, the light emitting element is affixed to the first stage, the light receiving element is affixed to the second stage, and the waveguide section is filled with a core material having a higher refractive index than that of the optical package substrate, after which a predetermined substrate is attached to the optical package substrate so as to cover the waveguide section by using an adhesive having a lower refractive index than that of the core material.

According to the eighth aspect, optical components, such as optical filters, and optical elements, such as lasers and photo-diodes, can be positioned and fixed with high precision simply by passively arranging these components and elements on an optical package substrate, with the waveguide section (waveguide channel) filled with the core material functioning as an optical waveguide. Thus, light transmitting/receiving modules with these optical components and optical elements mounted thereon can be mass-produced at low cost. Moreover, by providing a filter or an isolator between a light emitting element and an optical waveguide coupled thereto, it is possible to suppress reflected return light to the light emitting element and to reduce noise in transmitted light.

In a case where the optical waveguide core pattern is a waveguide diverging into branches, the first guide section may be provided for one of the branches so as to extend in a direction perpendicular to an optical axis of the one of the branches.

A ninth aspect of the present invention is directed to an optical package substrate for mounting an optical component and/or an optical element thereon, and an optical device using the same.

The optical package substrate of the ninth aspect comprises: at least one optical-fiber-positioning guide section for fixing an optical axis of at least one optical fiber mounted on the optical package substrate, the at least one guide section being formed as a groove extending in a surface of the optical package substrate from a predetermined side surface thereof to a predetermined location thereon; and a substrate-positioning terrace for fixing an optical waveguide substrate mounted on the optical package substrate so that an optical axis of an optical waveguide in the optical waveguide substrate is aligned with that of the at least one optical fiber, the substrate-positioning terrace being formed as a depression adjoining the at least one guide section at the predetermined location on the surface of the optical package substrate.

In the optical device using the optical package substrate of the ninth aspect, the at least one optical fiber is affixed to the at least one guide section of the optical package substrate, and the optical waveguide substrate is affixed to the terrace.

According to the ninth aspect, the guide section (guide groove) for positioning the optical fiber and the terrace for positioning the optical waveguide substrate are molded together in a single process so that the optical axis of the optical fiber to be mounted is aligned with that of the optical waveguide. Therefore, by using such an optical package substrate in which the optical fiber and the optical waveguide substrate are aligned with each other with high positional precision in the horizontal direction and in the vertical direction, it is possible to realize an easy connection and to improve production yield. Moreover, the optical device can be produced from the optical package substrate through a very simple process, thereby providing excellent productivity and economy.

In the ninth aspect, the optical waveguide in the optical waveguide substrate is formed by attaching a waveguide section corresponding to an optical waveguide core pattern that is molded in the optical waveguide substrate to the terrace of the optical package substrate via a core material having a higher refractive index than those of the optical waveguide substrate and the optical package substrate.

Thus, the optical waveguide and the optical fiber can easily be connected to each other simply by attaching the optical package substrate and the optical waveguide substrate to each other via the core material having a high refractive index.

A tenth aspect of the present invention is directed to an optical package substrate for mounting an optical component and/or an optical element thereon, and an optical device using the same.

The optical package substrate of the tenth aspect comprises: at least one optical-fiber-positioning guide section for fixing an optical axis of at least one optical fiber mounted on the optical package substrate, the at least one guide section being formed as a groove extending in a surface of the optical package substrate from a predetermined side surface thereof to a predetermined location thereon; a terrace formed as a depression adjoining the at least one guide section at the predetermined location on the surface of the optical package substrate; and at least one waveguide section corresponding to an optical waveguide core pattern, the at least one waveguide section being formed in a surface of the terrace so as to be aligned with the optical axis of the at least one optical fiber.

In the optical device using the optical package substrate of the tenth aspect, the at least one optical fiber is mounted on the at least one guide section of the optical package substrate, and the at least one waveguide section is filled with a core material having a higher refractive index than that of the optical package substrate, after which the at least one optical fiber mounted on the at least one guide section is affixed to an optical-fiber-fixing substrate by using an adhesive having a lower refractive index than that of the core material filled in the terrace.

According to the tenth aspect, it is possible to obtain an optical package substrate in which a guide section (guide groove) for positioning an optical fiber and a waveguide section (waveguide channel) corresponding to an optical waveguide core pattern are molded together in a single process. Therefore, by using such an optical package substrate in which the optical fiber and the optical waveguide substrate are aligned with each other with high positional precision in the horizontal direction and in the vertical direction, it is possible to realize an easy connection and to improve production yield. In the optical package substrate, a terrace-shaped waveguide section is filled with a core material having a high refractive index so as to make the waveguide section function as an optical waveguide. Therefore, the optical waveguide and the optical fiber can be aligned with each other with no active adjustment simply by affixing the optical fiber to the guide section. Thus, the optical device can be produced from the optical package substrate through a very simple process, thereby providing excellent productivity and economy.

An eleventh aspect of the present invention is directed to an optical package substrate for mounting an optical component and/or an optical element thereon.

The optical package substrate of the eleventh aspect comprises: at least one waveguide section corresponding to a predetermined optical waveguide core pattern, the at least one waveguide section being formed as a groove extending in a surface of the optical package substrate from a predetermined side surface thereof to a predetermined location thereon; and a substrate-positioning terrace for fixing an optical axis of an optical waveguide in an optical waveguide substrate mounted on the optical package substrate so that the optical axis of the optical waveguide is aligned with that of an optical waveguide formed in the waveguide section, the terrace being formed as a depression adjoining the guide section at the predetermined location on the surface of the optical package substrate.

According to the eleventh aspect, it is possible to obtain an optical package substrate in which a waveguide section (waveguide channel) corresponding to an optical waveguide core pattern and a terrace for positioning an optical waveguide substrate are molded together in a single process. Therefore, by using such an optical package substrate in which the optical waveguide and the optical waveguide substrate are aligned with each other with high positional precision in the horizontal direction and in the vertical direction, it is possible to realize an easy connection and to improve production yield.

Preferably, these optical package substrates as described above are formed by pressing a die against a substrate material, which has been softened by high-temperature heating, so as to transfer an inverted pattern of the die onto the substrate material. The die can be produced by using, in addition to a normal-grinding tool, a fine-grinding tool having a predetermined shape that is produced by micro-discharge machining. By using micro-discharge machining in this manner, it is possible to produce a die having a complicated shape that has been difficult to obtain with a conventional grinding process using a micro-grinder, or the like.

Moreover, these optical package substrates are preferably made of glass. If glass is used, a precise shape can be formed on a surface thereof using a die, and excellent stability can be provided in various environments. Since glass transmits UV light therethrough, fixing of optical fibers, and the like, can be performed with a UV-curing adhesive instead of a thermosetting adhesive, which takes longer time.

These and other objects, features, aspects and advantages of the present invention will become more apparent from the following detailed description of the present invention when taken in conjunction with the accompanying figures.

BRIEF DESCRIPTION OF THE DRAWINGS

FIG. 2 illustrates a method for finely processing a tool electrode by micro-discharge machining;

FIG. 20 illustrates a common method for producing a quartz-based optical waveguide substrate;

FIG. 21 illustrates a configuration of an optical device using the optical package substrate according to the ninth embodiment of the present invention;

FIG. 22 is a perspective view illustrating a shape of an optical package substrate according to a tenth embodiment of the present invention;

FIG. 23 illustrates a configuration of an optical device using the optical package substrate according to the tenth embodiment of the present invention;

FIG. 24 is a perspective view illustrating a shape of an optical package substrate according to an eleventh embodiment of the present invention;

DETAILED DESCRIPTION OF THE PREFERRED EMBODIMENTS

Preferred embodiments of the present invention will now be described with reference to the figures.

(Method for Producing a Die for Press Formation)

First, a processing method for obtaining a die that is required for producing optical package substrates of various embodiments of the present invention will be described. For this process, micro-discharge machining is used. For details of micro-discharge machining, see The Journal of the Japan Society for Precision Engineering, vol.61, No.10, p. 1370 (1995), or Optical Alliance, 1995.3, p. 28. Micro-discharge machining will now be described.

Figure 1:
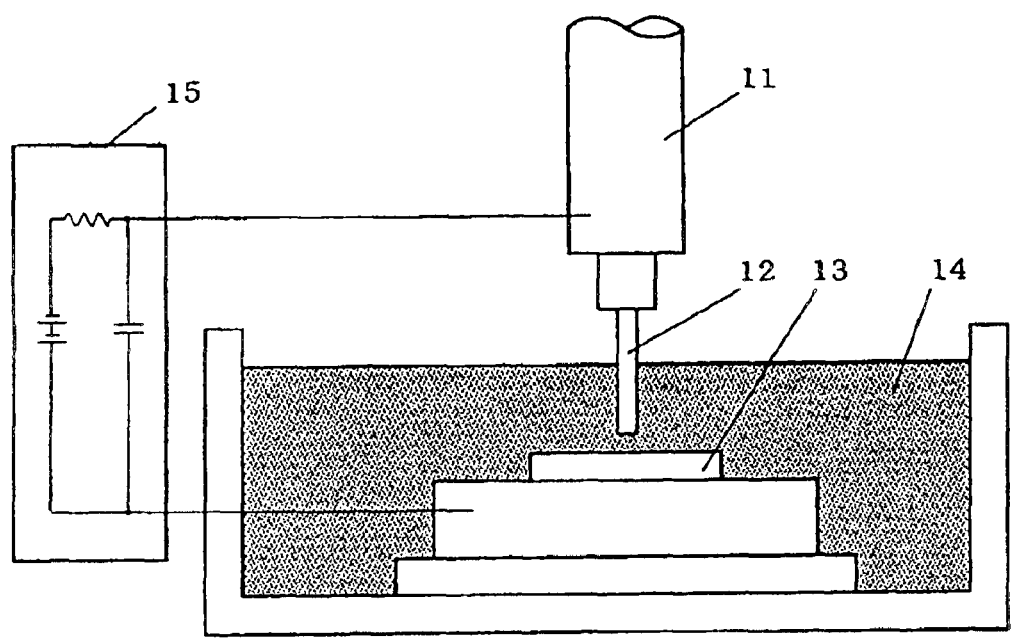
FIG. 1 is a schematic diagram illustrating a principle of common discharge formation.

FIG. 1 is a schematic diagram illustrating general principles of discharge machining. Referring to FIG. 1, a tool electrode 12 attached at a tip of a mandrel 11, which defines a rotational axis, and a work 13 (which functions as an electrode) as an object to be processed are immersed in an insulation liquid 14. In this commonly-practiced discharge machining, these two electrodes are brought close to each other while applying a predetermined voltage between the tool electrode 12 and the work 13 by virtue of a discharge generation section 15, thereby causing an electrical discharge through which the work 13 is melted away. As a wider gap is created due to melting of the work 13, the tool electrode 12 is further advanced by a corresponding distance. This process is repeated in order to process the work 13 into a desired configuration.

A micro-discharge machining technique, which is based on similar processing principles, utilizes a special discharge circuit to provide a discharge energy which is about 1/100 of what is normally used, thereby realizing coarse processing on the order of microns and fine processing on the order of sub-microns. This micro-discharge machining technique mainly has the following features:

(1) curved surfaces can be processed since the technique is based on non-contact processing;

(2) any electrically conductive material can be processed, regardless of its mechanical hardness;

(3) micro-processing (on the order of 0.1 $\mu$m) is enabled; and (4) micro-configurations can be processed since tools having a diameter of several microns can be used.

A feature of the present invention is to utilize micro-discharge machining to process a configuration of not only work but also a tool electrode itself, by taking advantage of the fine processing ability of micro-discharge machining techniques. As a result, a tool electrode of any configuration (e.g., triangular prism or a rectangular prism as well as a cylinder) can be realized in units of several millimeters or more. For example, since a tip of a tool electrode composed of sintered diamond or the like can be fine-processed into a cylindrical or conical shape, such a tool electrode can be used for micro-grinding a die.

Now, a method for fine processing a tool electrode will be described with reference to FIG. 2. A processing method which can be adopted for fine processing of a tool electrode is in itself disclosed in Japanese Patent Laid-Open Publication No. 2001-54808.

Referring to FIG. 2, a shaft-like tool material 22, which is to be processed, is attached to a tip of a mandrel 21. A position of the tool material 22 can be moved up or down along a rotational axis direction by virtue of a Z stage 27 equipped with a motor 26. Within a processing bath 29 which is placed on an X-Y stage 28, an electrode plate 23 for discharge machining is fixed. In the example illustrated in FIG. 2, the electrode plate 23 for discharge machining is fixed so as to be parallel to the Y axis and at an angle of 45° relative to the X-Y plane. An interior of the processing bath 29 is filled with an insulation liquid 24. A discharge generation section 25 composed of an RC circuit capable of generating discharge pulses of a minute energy level is coupled between the tool material 22 and the electrode plate 23 for discharge machining. Thus, it is possible to perform micro-discharge machining on the order of $\mu$m for the tool material 22.

In accordance with the above system configuration, a tip of the tool material 22 can be processed into a desired configuration through micro-discharge machining while sending the tool material 22, which is rotated (or reciprocated), toward the electrode plate 23 for discharge machining by virtue of the Z stage 27. FIG. 2 illustrates an example where the tool material 22 is processed so as to have a conical tip while being rotated. Note that sintered diamond for which a metal has been used as a binder can be employed as the tool material 22 because such sintered diamond is electrically conductive.

In order to attain efficiency in die production, the following work will ensue processing of the tool material 22.

By employing the X-Y stage 28 and the Z stage 27, processed tool material 22, i.e., a tool electrode, is moved toward work 30 which has previously been fixed in the processing bath 29, and positioned in place. This positioning can be achieved by detecting electrical conduction between the tool electrode and the work 30, and the two are gradually brought near each other. Next, the tool electrode is moved in a desired direction while being rotated, so as to be pressed against a portion previously processed on a surface of the work 30 which requires precision finishing (i.e., slopes of a V-shaped protrusion in the example shown in FIG. 2). As a result, shaping precision and planar precision of this desired portion (i.e., the slopes of the V-shaped protrusion in this example) can be improved.

Thus, by employing a method which makes use of a fine-processed tool electrode, it becomes possible to realize an ultra-hard alloy die having a sub-micron level shaping precision, which is mirror-finished to a surface coarseness on the order of Ra 20 nm or less, although this has conventionally been impossible. As planar precision of a die surface improves, positioning precision of optical fibers or other components (e.g., planar precision of a guide groove) is improved, whereby performance of optical coupling efficiency can be improved. Moreover, since an improved planar precision of the die surface facilitates a release process which is associated with molding, the die is exposed to less stress, whereby durability of the die is improved for a higher productivity and economy.

Note that a conventional micro-grinder-based grinding process will result in a surface coarseness several times the aforementioned value. This is presumably because a grinding process which utilizes a micro-grinder naturally requires a continuous and high-speed processing down to a substantial depth, resulting in a lower planar precision of a final plane.

As described above, by using micro-discharge machining for processing a tool electrode, it is possible to produce precise tool electrodes of various shapes, and it is thus possible to produce dies of complicated shapes using such tool electrodes.

Although an ultra-hard alloy is exemplified as a die material in the above description, any electrically conductive material having a sufficient heat resistance and mechanical strength can be used, e.g., SUS. Alternatively, an ultra-hard alloy or the like may be used as a parent material for a die; an electrically conductive film such as a precious metal alloy film may be formed on a surface thereof; and this film may be processed into a desired configuration.

(Examples of Optical Package Substrates to be Molded)

Next, specific examples of optical package substrates to be molded by using a die that is produced by the process as described above will be described.

Each of the optical package substrates of the present invention to be described below is composed of a glass material, and is molded by pressing a die against the glass material, which has been softened by high-temperature heating, so as to transfer a shape of the die onto a surface of the glass material (press formation). Although glass material which is thermally, mechanically, and chemically stable is preferable as material of an optical package substrate, any other material which permits press formation can also be used. The inventors have confirmed through experimentation that press formation can be successfully performed by pressing an ultra-hard alloy die, on which a protective film composed of a precious metal alloy is formed, against an optical glass substrate which is heated to 580° C. in a nitrogen gas atmosphere.

First Embodiment

Figure 3:
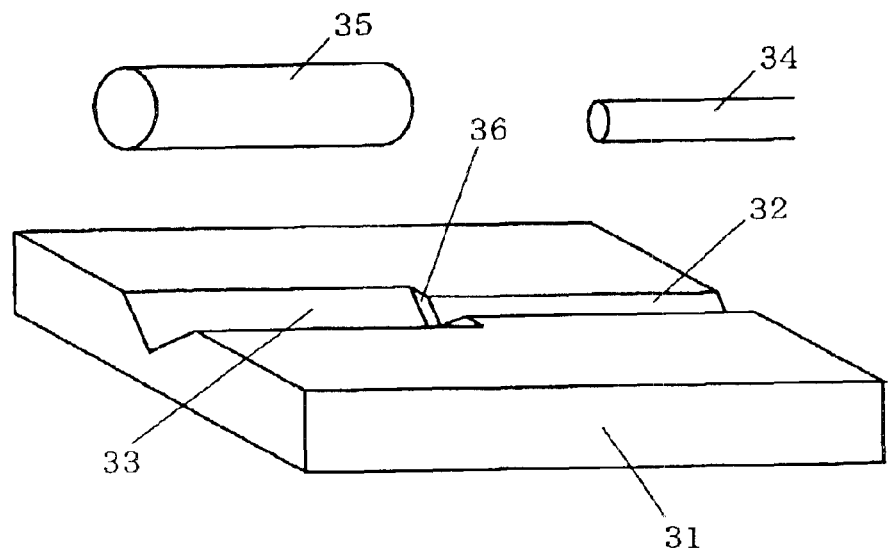
FIG. 3 is a perspective view illustrating a shape of an optical package substrate according to a first embodiment of the present invention.

FIG. 3 is a perspective view illustrating a shape of an optical package substrate 31 according to a first embodiment of the present invention. Referring to FIG. 3, a first guide groove 32 for positioning an optical fiber 34 and a second guide groove 33 for positioning a lens 35 are formed in a surface of the optical package substrate 31. The first guide groove 32 and the second guide groove 33 adjoin each other, with a junction 36 extending perpendicular to a groove direction. Positions and depths of the first guide groove 32 and the second guide groove 33 are such that an optical axis of the optical fiber 34 is aligned with that of the lens 35 when the lens 35 is abutted against the junction 36 while the optical fiber 34 is abutted against the lens 35.

Figure 4:
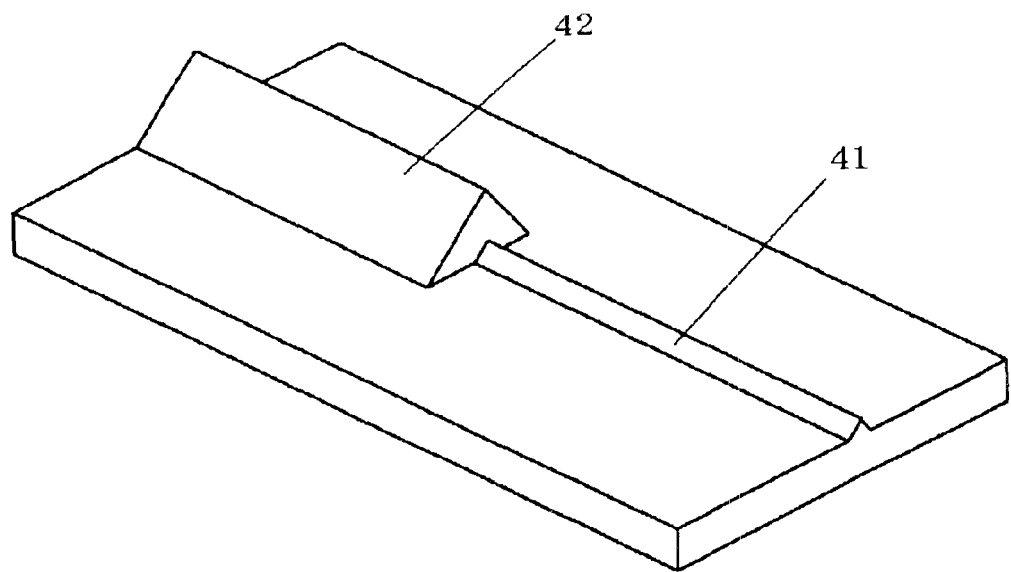
FIG. 4 is a perspective view illustrating a die used for molding an optical package substrate according to the first embodiment.

The die used for molding the optical package substrate 31 includes a protrusion 41 for molding the first guide groove 32 and another protrusion 42 for molding the second guide groove 33, as illustrated in FIG. 4.

Figure 5A:
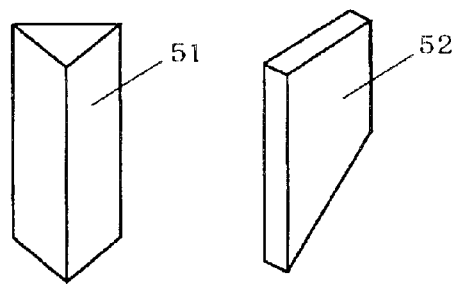
FIG. 5A to FIG. 5C illustrate how a die is made with a tool electrode that is finely processed by micro-discharge machining.

Triangular-prism-shaped protrusions 41 and 42 can be formed on the die as follows. First, a tool electrode 51 having a triangular prism shape and another tool electrode 52 having a scalpel-like shape are produced, as illustrated in FIG. 5A. Then, micro-discharge machining is performed using the tool electrode 51, with a work 53 being upright (left side of FIG. 5B) to coarsely process a protrusion having a triangular prism shape on a surface of the work 53 (right side of FIG. 5B). In a case where protrusions of different sizes are formed, as in the optical package substrate 31, a plurality of triangular-prism-shaped tool electrodes having different cross sections may be used, or an amount by which the work 53 is moved by an X-Y stage may be varied. Then, a grinding process is performed using the tool electrode 52, with the work 53 being laid down (left side of FIG. 5C) to finely process a surface of the protrusion formed on the work 53 (right side of FIG. 5C).

The second guide groove 33 formed as described above is particularly suitable for placing a cylindrical rod lens, e.g., a self-converging rod lens. For example, in a case where a self-converging rod lens whose pitch is 0.25 is placed in the second guide groove 33, light from the optical fiber 34 is converted into collimated light through the self-converging rod lens. By using another self-converging rod lens having a different pitch, light from the optical fiber 34 can be converged at a predetermined position along an optical axis. A drum lens, an aspheric lens, and the like, can also be fixed to the second guide groove 33.

An optical device obtained by mounting the optical fiber 34 and the lens 35 on the optical package substrate 31 can be used as a fiber collimator, or the like.

Second Embodiment

Figure 6:
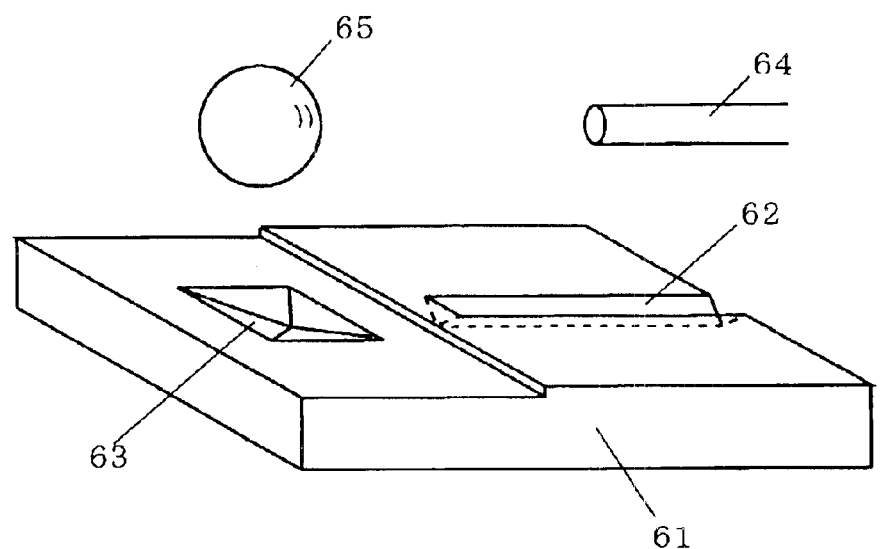
FIG. 6 is a perspective view illustrating a shape of an optical package substrate according to a second embodiment of the present invention.

FIG. 6 is a perspective view illustrating a shape of an optical package substrate 61 according to a second embodiment of the present invention. Referring to FIG. 6, a first guide groove 62 for positioning an optical fiber 64 and a second guide groove 63 for positioning a ball lens 65 are formed in a surface of an optical package substrate 61. A plane in which the first guide groove 62 is formed has a level difference with respect to a plane in which the second guide groove 63 is formed. The first guide groove 62 is shaped so that the optical fiber 64 can be placed therein and abutted against one end thereof that is closer to the ball lens 65 with a core portion of the optical fiber 64 being above a surface of the optical package substrate 61. A position and depth of the second guide groove 63 are such that when the ball lens 65 is placed therein, the core portion of the optical fiber 64 and the ball lens 65 are in a predetermined positional relationship. With such a configuration, a distance between an end face of the optical fiber 64 and the ball lens 65, when these components are mounted, can be fixed to a predetermined value.

An optical device obtained by mounting the optical fiber 64 and the ball lens 65 on the optical package substrate 61 functions so that light from the optical fiber 64 is converted into collimated light or converged light through the ball lens 65.

The optical device obtained by mounting the optical fiber 64 and the ball lens 65 on the optical package substrate 61 can be used as a fiber collimator, or the like.

An aspheric lens, or the like, may be used instead of the ball lens 65. In such a case, the second guide groove 63 may be shaped according to a shape of the aspheric lens, or the like.

Third Embodiment

Figure 7:
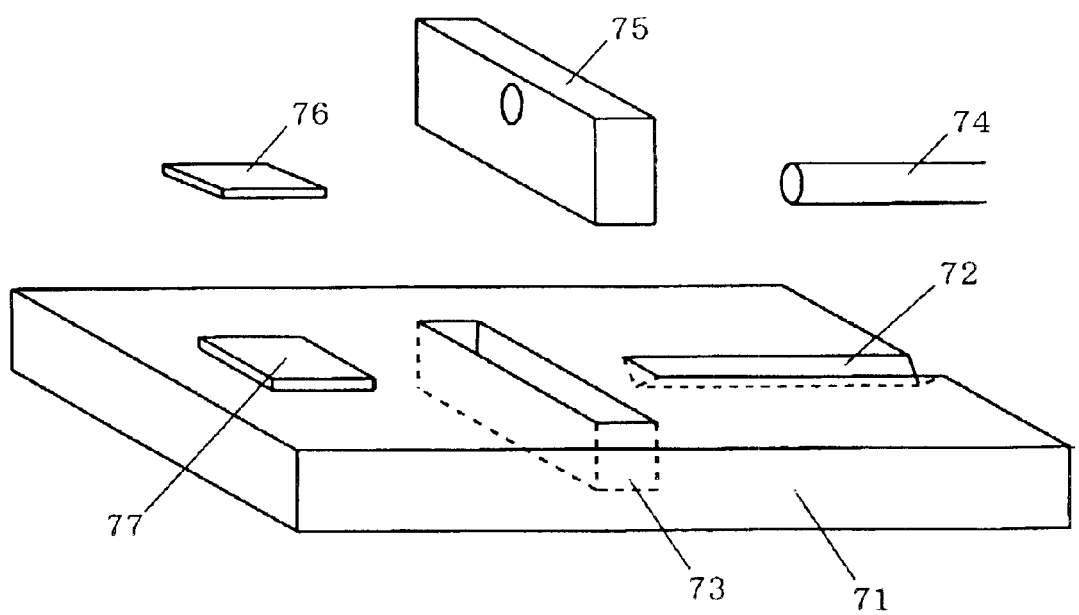
FIG. 7 is a perspective view illustrating a shape of an optical package substrate according to a third embodiment of the present invention.

FIG. 7 is a perspective view illustrating a shape of an optical package substrate 71 according to a third embodiment of the present invention. Referring to FIG. 7, a first guide groove 72 for positioning an optical fiber 74, a second guide groove 73 for positioning a flat micro-lens 75, and a stage 77 for positioning a laser 76 are formed in or on a surface of the optical package substrate 71. The first guide groove 72 is shaped so that the optical fiber 74 can be placed therein and abutted against one end thereof that is closer to the flat micro-lens 75 with a core portion of the optical fiber 74 being above the surface of the optical package substrate 71. A length and width of the second guide groove 73 are determined according to a shape of the flat micro-lens 75 so that the flat micro-lens 75 can be positioned with a micron-order precision simply by fitting the flat micro-lens 75 into the second guide groove 73. The guide grooves 72 and 73 and the stage 77 are formed at predetermined positions with predetermined depths so that optical axes of the flat micro-lens 75, the optical fiber 74 and the laser 76, when they are mounted on the optical package substrate 71, are aligned together. The laser 76 is positioned on the stage 77 by using a marker (not shown) without actively adjusting a position thereof. Alternatively, the laser 76 may be positioned by using the marker alone without forming the stage 77.

An optical device obtained by mounting the optical fiber 74, the flat micro-lens 75 and the laser 76 on the optical package substrate 71 functions so that light exiting the laser 76 is converged through the flat micro-lens 75 so as to be coupled to the optical fiber 74, which is affixed to the first guide groove 72. With a driving circuit connected to the laser 76, the optical device can be used as a light transmitting module. The driving circuit may be provided on the optical package substrate 71 or on a different substrate.

Alternatively, a photo-diode, which is a light receiving element, may be used instead of the laser 76, which is a light emitting element. In such a case, the optical device functions so that light exiting the optical fiber 74 is converged through the flat micro-lens 75 so as to be detected by the photo-diode. With a pre-amplifier connected to the photo-diode, the optical device can be used as a light receiving module.

Fourth Embodiment

Figure 8:
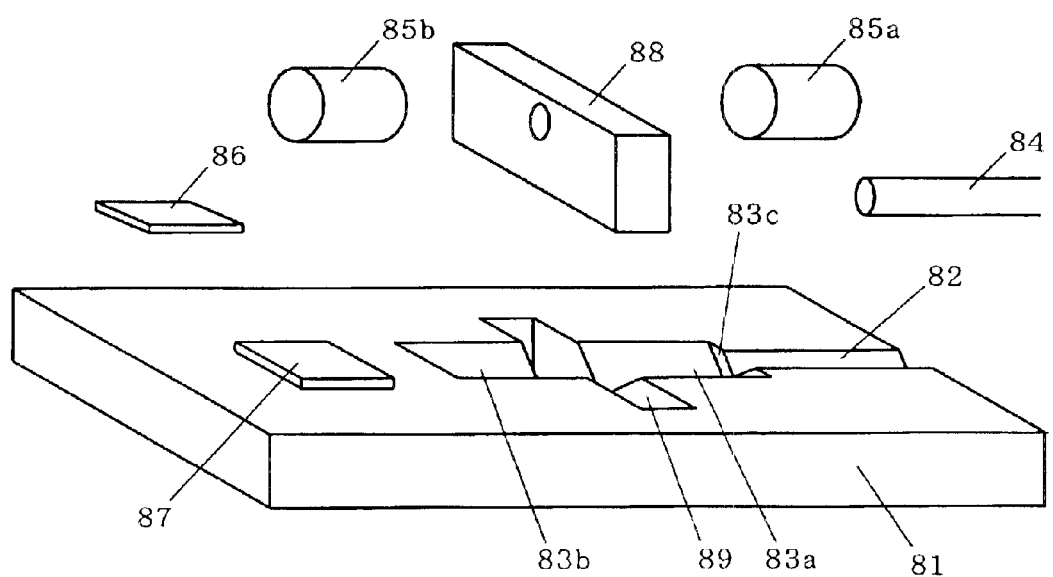
FIG. 8 is a perspective view illustrating a shape of an optical package substrate according to a fourth embodiment of the present invention.

FIG. 8 is a perspective view illustrating a shape of an optical package substrate 81 according to a fourth embodiment of the present invention. Referring to FIG. 8, a first guide groove 82 for positioning an optical fiber 84, a second guide groove 83a for positioning a first lens 85a, a slit groove 89 for positioning a flat isolator 88, a third guide groove 83b for positioning a second lens 85b, and a stage 87 for positioning a laser 86 are formed in or on a surface of the optical package substrate 81. The first guide groove 82, the second guide groove 83a and the slit groove 89 adjoin together, with a junction 83c extending perpendicular to a groove direction. Positions and depths of the first guide groove 82 and the second guide groove 83a are such that when the first lens 85a is abutted against the junction 83c of the second guide groove 83a, and the optical fiber 84 is abutted against the first lens 85a, optical axes of the optical fiber 84 and the first lens 85a are aligned with each other.

The second guide groove 83a, as that in the first embodiment, is suitable for receiving a self-converging rod lens. In a case where a self-converging rod lens whose pitch is 0.25 is placed in the second guide groove 83a, light from the optical fiber 84 is converted into collimated light through the self-converging rod lens. A length and width of the slit groove 89 are determined according to a shape of the flat isolator 88 so that the flat isolator 88 can be positioned with micron-order precision simply by fitting the flat isolator 88 into the slit groove 89. The third guide groove 83b adjoins the slit groove 89 and is shaped so that when the second lens 85b is mounted in the third guide groove 83b, an optical axis of the second lens 85b is aligned with those of other components. The laser 86 is positioned on the stage 87 by using a marker (not shown) without actively adjusting a position thereof. Alternatively, the laser 86 may be positioned by using the marker alone without forming the stage 87.

An optical device obtained by mounting the optical fiber 84, the first lens 85a, the second lens 85b, the flat isolator 88 and the laser 86 on the optical package substrate 81 functions so that light exiting the laser 86 is converted into collimated light through the second lens 85b and passes through the flat isolator 88, after which the light is converged through the first lens 85a so as to be coupled to the optical fiber 84. Even if there is some stray light, such as reflected return light, traveling from the optical fiber 84 toward the laser 86, such stray light is cut off by the flat isolator 88 and does not reach the laser 86, thereby preventing signal noise from occurring.

With a driving circuit connected to the laser 86, the optical device can be used as a light transmitting module. The driving circuit may be provided on the optical package substrate 61 or on a different substrate.

Alternatively, a photo-diode, or the like, which is a light receiving element, may be used instead of the laser 86, which is a light emitting element. In such a case, the optical device functions so that light exiting the optical fiber 84 is converged through the first and second lenses 85a and 85b so as to be detected by the photo-diode. With a pre-amplifier connected to the photo-diode, the optical device can be used as a light receiving module.

While two lenses, i.e., the first and second lenses 85a and 85b, are used in the present embodiment, the first lens 85a may be omitted because light that is input to the flat isolator 88 does not need to be collimated light. In such a case, these components can be arranged so that light exiting the laser 86 is converged through the second lens 85b so as to be coupled to the optical fiber 84.

An optical filter, a wave plate, or a thin-film ND filter (neutral density filter) may be used instead of the flat isolator 88.

Fifth Embodiment

Figure 9:
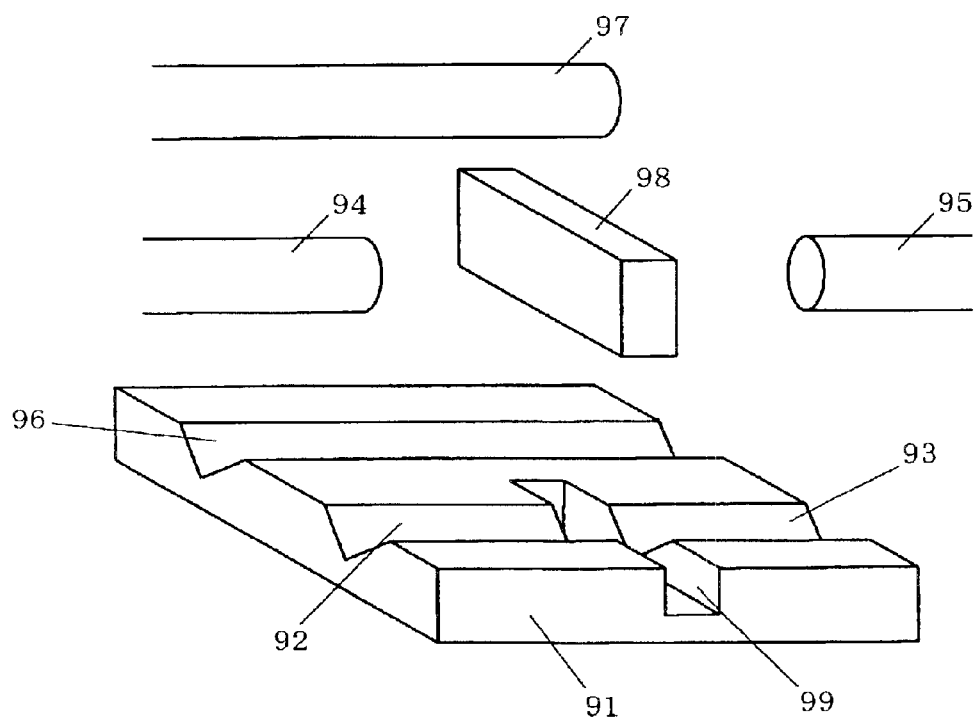
FIG. 9 is a perspective view illustrating a shape of an optical package substrate according to a fifth embodiment of the present invention.

FIG. 9 is a perspective view illustrating a shape of an optical package substrate 91 according to a fifth embodiment of the present invention. Referring to FIG. 9, a first guide groove 92 for positioning a first optical fiber 94, a second guide groove 93 for positioning a second optical fiber 95, a third guide groove 96 for positioning a third optical fiber 97, and a slit groove 99 for positioning an ND filter 98 are formed in a surface of the optical package substrate 91. The first guide groove 92, the slit groove 99 and the second guide groove 93 are arranged in this order adjoining one another. Positions and depths of the first and second guide grooves 92 and 93 are such that when the first optical fiber 94 is placed in the first guide groove 92 and the second optical fiber 95 is placed in the second guide groove 93, optical axes of the optical fibers are aligned with each other. The slit groove 99 is not cut across the third guide groove 96.

Figure 10:
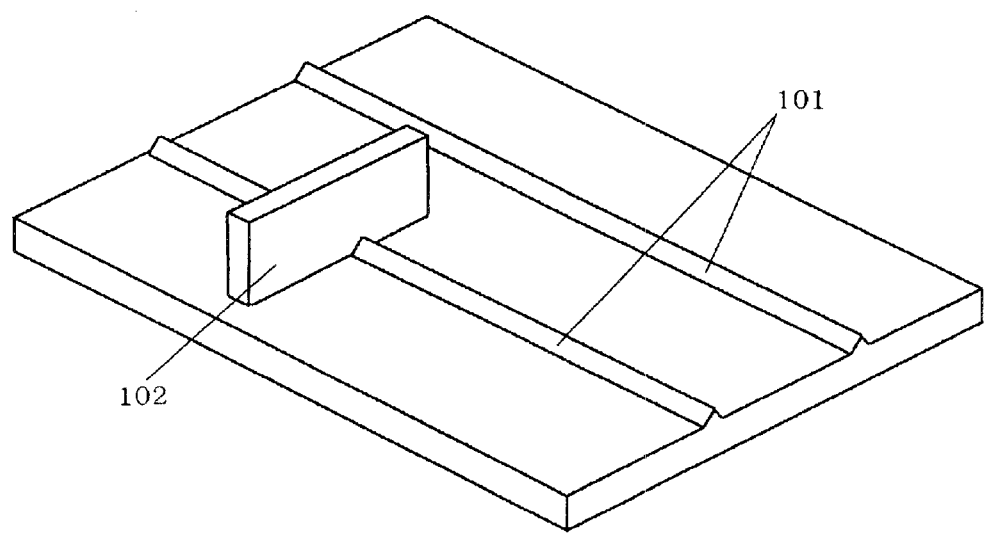
FIG. 10 is a perspective view illustrating a die used for molding the optical package substrate according to the fifth embodiment.

A die used for molding the optical package substrate 91 includes, on a surface thereof, protrusions 101 for molding the first to third guide grooves 92, 93 and 96, and another protrusion 102 for molding the slit groove 99, as illustrated in FIG. 10.

Figure 11:
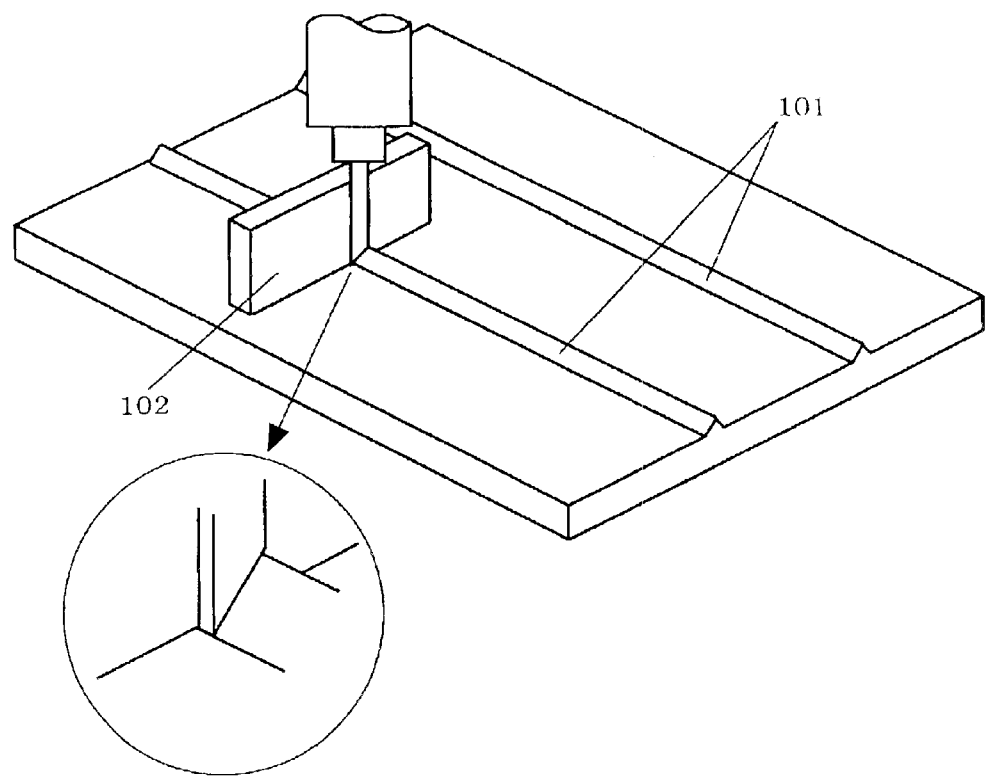
FIG. 11 illustrates how planar precision of the die of FIG. 10 is improved by a fine grinding process.

Each triangular-prism-shaped protrusion 101 can be formed on the die as follows. Tool electrode 51 having a triangular prism shape and tool electrode 52 having a scalpel-like shape are used as described above in the first embodiment. Micro-discharge machining is performed using the tool electrode 51, with a work being upright to coarsely process a protrusion having a triangular prism shape on the surface of the work (see FIG. 5B). By processing the work starting from opposite end faces thereof, the work can be coarsely processed while leaving a portion from which the protrusion 102 for molding the slit groove 99 is to be formed. Then, a grinding process is performed using the tool electrode 52, with the work being laid down to finely process the surface of the protrusion formed on the work (FIG. 11).

An optical package substrate having such a configuration can be used for connecting an optical waveguide by arranging a plurality of optical fibers parallel to each other at regular intervals, as in a common V groove array substrate, for example. The optical package substrate 91 of the present embodiment includes the slit groove 99 formed only along predetermined optical fiber paths (paths of the first and second optical fibers 94 and 95), and intensity of light that is guided through the predetermined optical fibers can be selectively reduced by the ND filter 98. The first optical fiber 94 and the second optical fiber 95 have their optical axes aligned with each other, and propagation loss can be reduced by vertically cutting off an end face of each optical fiber. With such a configuration, intensities of light beams that are guided through different optical fibers arranged on the same optical package substrate can be made substantially equal to each other. For example, in a case where light beams that are guided through different optical fibers are received by different photo-diodes, using one photo-diode for each light beam, an electric conversion circuit system can be simplified if light intensity levels are substantially equal to each other. Therefore, such a configuration is advantageous.

By using a wavelength filter instead of the ND filter 98, light of a particular wavelength can be passed only through a particular optical fiber.

As described above, with the shapes of the optical package substrates according to the first to fifth embodiments, optical components, such as optical fibers and optical lenses, and optical elements, such as lasers and photo-diodes, can be positioned and fixed with high precision simply by passively arranging the components and elements. Thus, optical devices with these optical components and elements mounted thereon can be mass-produced at low cost.

Optical fibers, lenses, and the like, can easily be fixed by using a UV-curing adhesive. Particularly, performance can be maintained more stably for longer periods of time by fixing optical fibers, lenses, and the like, on an optical package substrate and then pressing a substrate made of glass, or the like, onto upper portions thereof.

A guide groove preferably has a sufficient depth for stably holding an optical fiber, a lens, or the like. A cross-sectional shape of the guide groove does not need to be a V shape, but may alternatively be a rectangular shape, a semicircular shape, or the like. Guide grooves may be formed in different planes with a level difference therebetween as long as optical axis alignment is ensured.

In order to reduce reflection occurring between an optical fiber and a lens, an anti-reflection film may be provided on each of the optical fiber and the lens, or a face through which light enters the lens may be cut in an oblique direction.

A similar configuration may be realized by using an optical waveguide instead of an optical fiber. In such a case, a waveguide channel corresponding to an optical waveguide core pattern can be molded in an optical package substrate, instead of molding a guide groove for an optical fiber, and a core portion can be formed along the waveguide channel by using a method to be described later.

Sixth Embodiment

In the first to fifth embodiments above, optical package substrates including a guide groove for fixing an optical fiber have been illustrated.

In this and other subsequent embodiments, optical package substrates including a core pattern channel, which is a base of an optical waveguide for propagating light through a core portion in a confined manner, as in an optical fiber, and light transmitting/receiving modules using the same, will be described.

Figure 12:
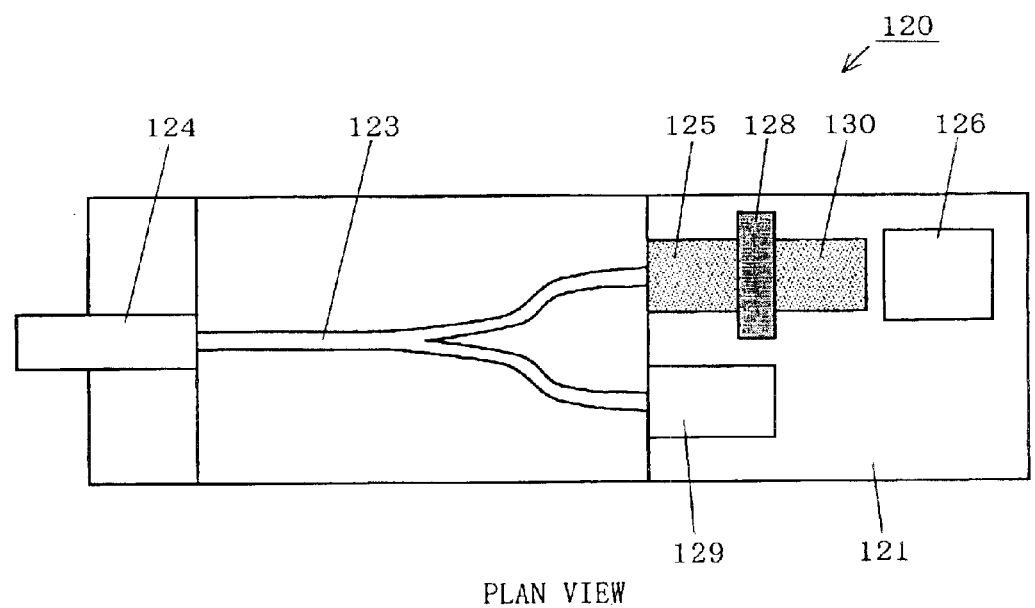
FIG. 12 illustrates a configuration of a light transmitting/receiving module using an optical package substrate according to a sixth embodiment of the present invention.

FIG. 12 illustrates a configuration of a light transmitting/ receiving module 120 using an optical package substrate 121 according to a sixth embodiment of the present invention.

FIG. 12 shows a plan view and a side view of the light transmitting/receiving module 120. A waveguide channel 123 corresponding to an optical waveguide core pattern, guide grooves for positioning an optical fiber 124, a first lens 125 and a second lens 130, a slit groove for positioning a flat isolator 128, a stage for positioning a laser 126, and another stage for positioning a photo-diode 129 are formed in or on the optical package substrate 121, which is a base plate of the light transmitting/receiving module 120. A surface configuration of the optical package substrate 121, except for that of the optical waveguide, has already been described in the first to fifth embodiments above, and will not be further described below. A surface of the optical package substrate 121 is shaped so that optical components and elements to be mounted thereon can be positioned simply by affixing the components and elements in or on the grooves and stages.

Figure 13:
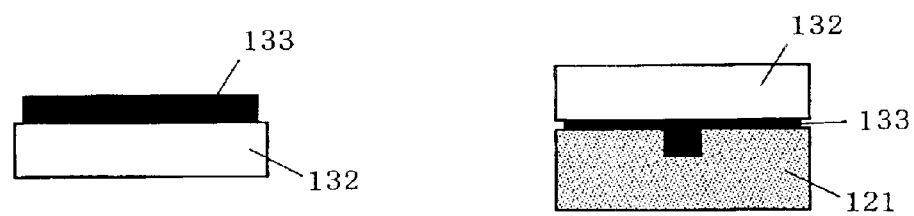
FIG. 13 illustrates a method for forming an optical waveguide by using a waveguide channel on an optical package substrate.

A method for forming an optical waveguide in the waveguide channel 123 will now be described with reference to FIG. 13. FIG. 13 is a cross-sectional view illustrating an optical waveguide to be formed in the optical package substrate 121.

First, a transparent base material 132 having substantially the same refractive index as that of the optical package substrate 121 with the waveguide channel 123 formed therein is provided, and a thin layer of a UV-curing adhesive 133, having a higher refractive index than those of both the optical package substrate 121 and the transparent base material 132, is applied on the transparent base material 132 (left side of FIG. 13). Then, the optical package substrate 121 and the transparent base material 132 are attached together with a side of the UV-curing adhesive 133 facing the waveguide channel 123 (right side of FIG. 13). Finally, this structure is irradiated with UV light so that the optical package substrate 121 and the transparent base material 132 are adhered and fixed to each other. In this method, if an adhesive layer, other than the portion in the waveguide channel 123, which is left between the optical package substrate 121 and the transparent base material 132 after the attachment process, is sufficiently thin, a portion of the UV-curing adhesive 133 filling the waveguide channel 123 can function as an optical waveguide.

In the light transmitting/receiving module 120 illustrated in FIG. 12, the transparent base material 132, which is a transparent smooth glass, is attached to the optical package substrate 121 covering the waveguide channel 123, thereby forming an optical waveguide. The optical waveguide diverges into two branches so that transmitted light and received light can be handled by a single optical fiber 124. The flat isolator 128 is used in the illustrated example, whereby signals can be transmitted and received with light of a single wavelength. In a case where signals are transmitted and received in the form of light of one wavelength and light of another wavelength, respectively, an optical filter that reflects either transmitted light (having one wavelength) or received light (having the other wavelength) and yet passes the other light therethrough can be provided instead of the flat isolator 128.

In the prior art, a light transmitting/receiving module having a function as that of the light transmitting/receiving module illustrated in FIG. 12 is obtained by forming an optical waveguide in a silicon substrate to be a base. However, formation of such an optical waveguide requires a plurality of thin film deposition steps and core patterning steps, thereby resulting in quite poor productivity, while requiring repeated dicing steps for mounting various components. Moreover, a lens to be used is limited to a flat lens. In contrast, with the light transmitting/receiving module of the present embodiment, it is easy to form an optical waveguide, while optical components and elements can be mounted with no active adjustment. Thus, it is possible to realize a light transmitting/receiving module that can be produced at a very low cost and with high productivity.

Seventh Embodiment

Figure 14:
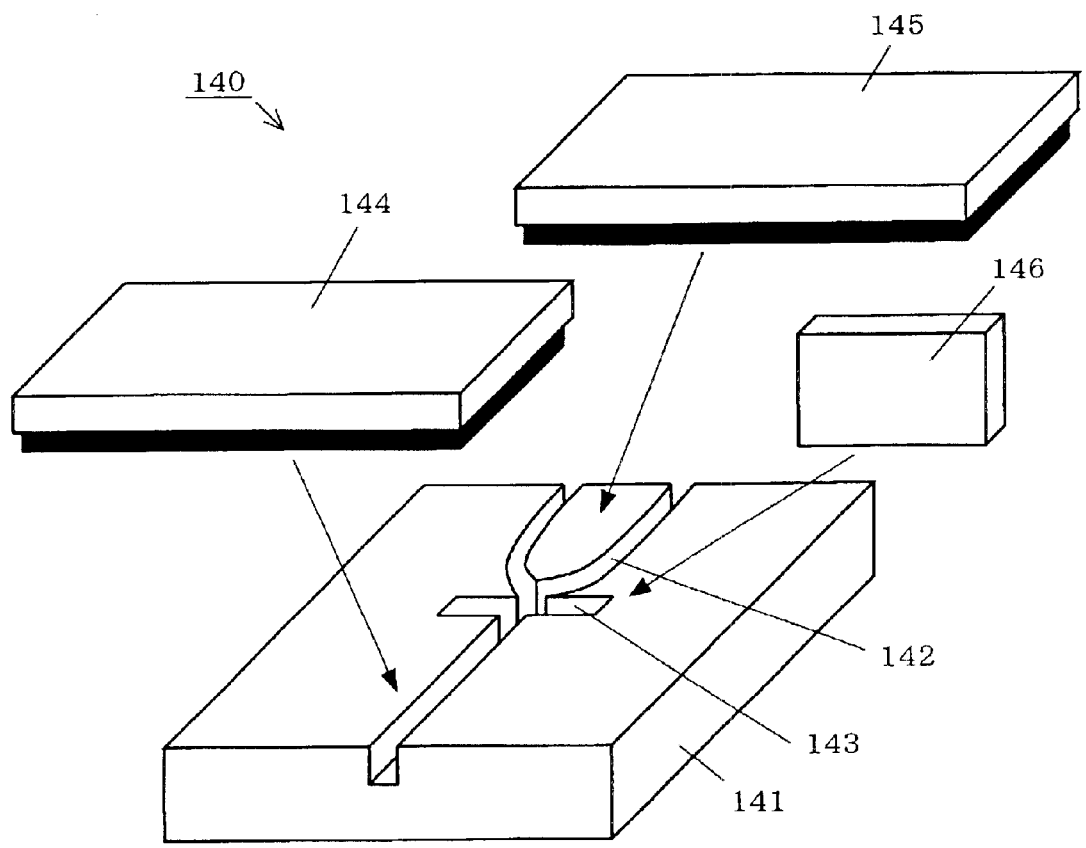
FIG. 14 is a perspective view illustrating a configuration of a light transmitting/receiving module using an optical package substrate according to a seventh embodiment of the present invention.

FIG. 14 is a perspective view illustrating a configuration of a light transmitting/receiving module 140 using an optical package substrate 141 according to a seventh embodiment of the present invention. A waveguide channel 142 corresponding to an optical waveguide core pattern and a slit groove 143 for positioning an optical filter 146 are formed in the optical package substrate 141, which is a base plate of the light transmitting/receiving module 140. A first smooth glass substrate 144 and a second smooth glass substrate 145, each with a UV-curing adhesive applied thereon, are attached to the optical package substrate 141 covering the waveguide channel 142, and are adhered on the optical package substrate 141 as this structure is irradiated with UV light. Thus, a two-branch optical waveguide is formed. The optical filter 146 is inserted into the slit groove 143.

Figure 15:
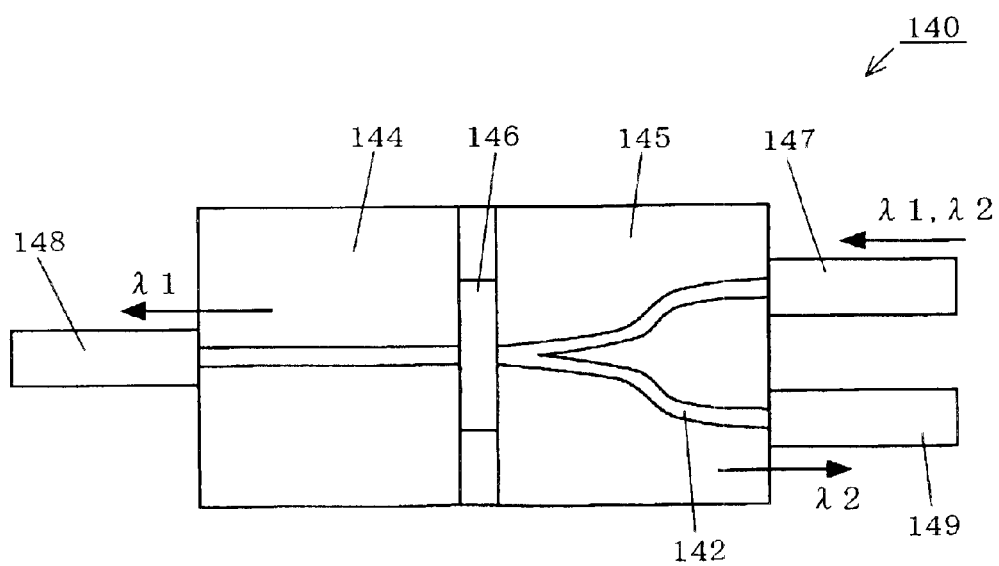
FIG. 15 illustrates the light transmitting/receiving module of FIG. 14 with optical fibers connected thereto.

FIG. 15 illustrates structure of an optical device obtained by connecting optical fibers to the optical package substrate 141 with various components mounted thereon.

Light of two wavelengths $\lambda 1$ and $\lambda 2$ is propagated through a first optical fiber 147. The light is coupled to one of the two branches of the waveguide channel 142 and reaches the optical filter 146. Light of the wavelength $\lambda 1$ is transmitted through the optical filter 146 and output to a second optical fiber 148. On the other hand, light of the wavelength $\lambda 2$ is reflected by the optical filter 146 and is output to a third optical fiber 149 via the other branch of the waveguide channel 142. Thus, with the structure illustrated in FIG. 15, it is possible to realize an optical device having a wavelength separation function.

An optical device in which a groove is cut into an optical waveguide substrate by dicing, with an optical filter inserted into the groove, has been proposed in the prior art. However, positional precision during a dicing process is too stringent to realize a desirable productivity. In contrast, in the optical device of the present embodiment, the slit groove 143 can be formed by press formation simultaneously with the waveguide channel 142 corresponding to the optical waveguide core pattern, thereby always ensuring the same positional relationship. Therefore, optical devices having stable characteristics can be mass-produced at low cost.

Eighth Embodiment

Figure 16:
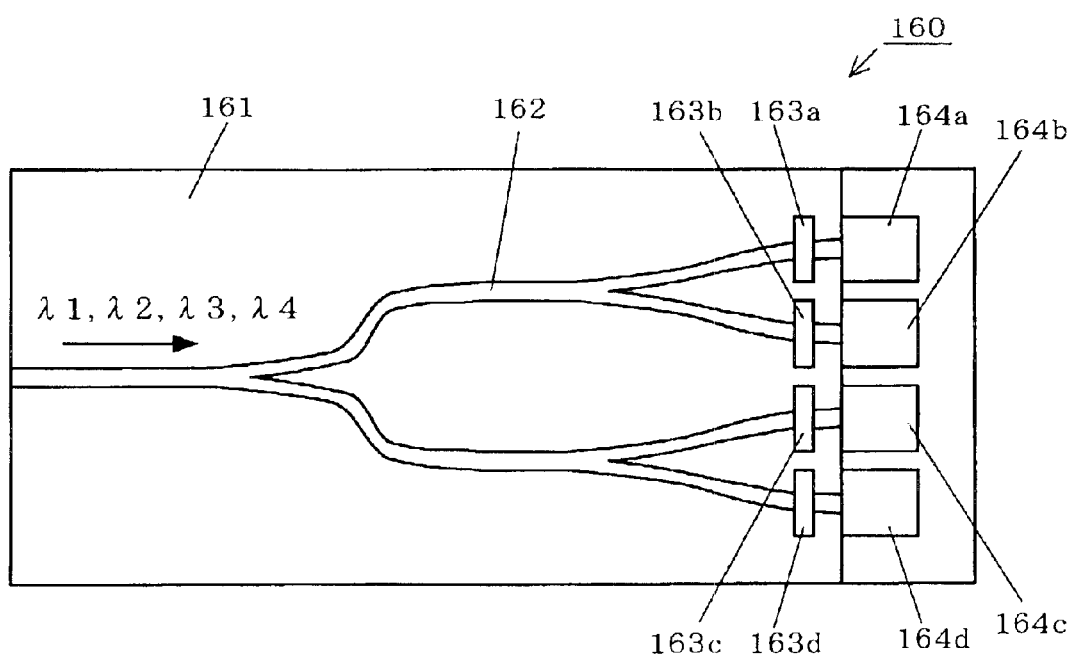
FIG. 16 illustrates a configuration of a light transmitting/receiving module using an optical package substrate according to an eighth embodiment of the present invention.

FIG. 16 illustrates a configuration of a light transmitting/receiving module 160 using an optical package substrate 161 according to an eighth embodiment of the present invention. A waveguide channel 162 corresponding to an optical waveguide core pattern and first to fourth slit grooves (not shown) for positioning first to fourth optical filters 163a to 163d, respectively, are formed in the optical package substrate 161, which is a base plate of the light transmitting/receiving module 160. As in the seventh embodiment described above, a smooth glass substrate with a UV-curing adhesive applied thereon, is attached to the optical package substrate 161 covering the waveguide channel 162, and is adhered on the optical package substrate 161 as this structure is irradiated with UV light. Thus, a four-branch optical waveguide is formed. At an end of waveguide branches, four photo-diodes 164a to 164d are arranged via the optical filters 163a to 163d, respectively.

Light of four wavelengths $\lambda 1, \lambda 2, \lambda 3$ and $\lambda 4$ is input to the waveguide channel 162 from the left side of the figure. The light is divided into four by the optical waveguide, and the photo-diode 164a only receives light of the wavelength $\lambda 1$ through the first optical filter 163a, the photo-diode 164b only receives light of the wavelength $\lambda 2$ through the second optical filter 163b, the photo-diode 164c only receives light of the wavelength $\lambda 3$ through the third optical filter 163c, and the photo-diode 164d only receives light of the wavelength $\lambda 4$ through the fourth optical filter 163d. Thus, with the structure illustrated in FIG. 16, it is possible to realize a light receiving module having a multi-wavelength communications function.

An optical device in which a groove is cut into an optical waveguide substrate by dicing, with an optical filter inserted within the groove, has been proposed in the prior art. However, when a groove is formed by dicing, a uniform groove depth cannot be obtained unless the groove is cut across an entire width of the substrate. Therefore, it is difficult to employ an optical filter arrangement as that of the present embodiment. In contrast, in the optical module of the present embodiment, the slit grooves for the first to fourth optical filters 163a to 163d can be formed by press formation simultaneously with the waveguide channel 162 corresponding to the optical waveguide core pattern, thereby always ensuring the same positional relationship. Therefore, optical modules having stable characteristics can be mass-produced at low cost.

As described above, with shapes of the optical package substrates according to the sixth to eighth embodiments, optical components, such as optical waveguides, optical fibers and optical filters, and optical elements, such as lasers and photo-diodes, can be positioned and fixed with high precision simply by passively arranging these components and elements. Thus, light receiving modules with these optical components and elements mounted thereon can be mass-produced at low cost.

Ninth Embodiment

Figure 17:
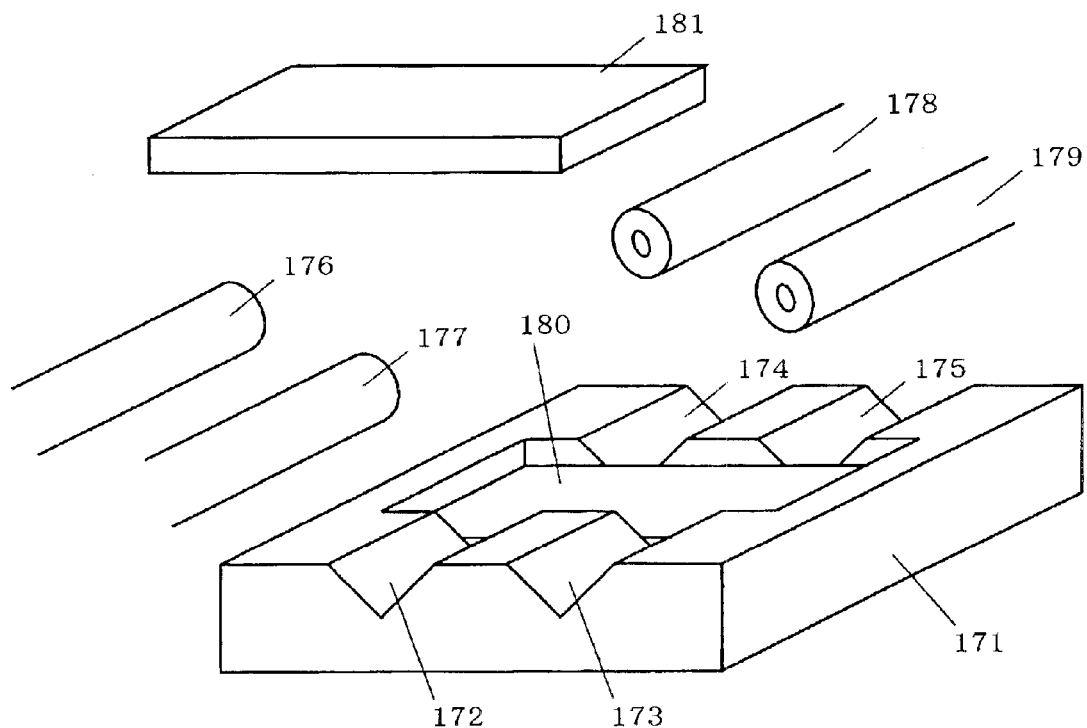
FIG. 17 is a perspective view illustrating a shape of an optical package substrate according to a ninth embodiment of the present invention.

FIG. 17 is a perspective view illustrating a shape of an optical package substrate 171 according to a ninth embodiment of the present invention. Referring to FIG. 17, first to fourth guide grooves 172 to 175 for positioning first to fourth optical fibers 176 to 179, respectively, and a terrace 180 for positioning an optical waveguide substrate 181 are formed in a surface of the optical package substrate 171. The guide grooves 172 to 175 and the terrace 180 adjoin together.

Figure 18:
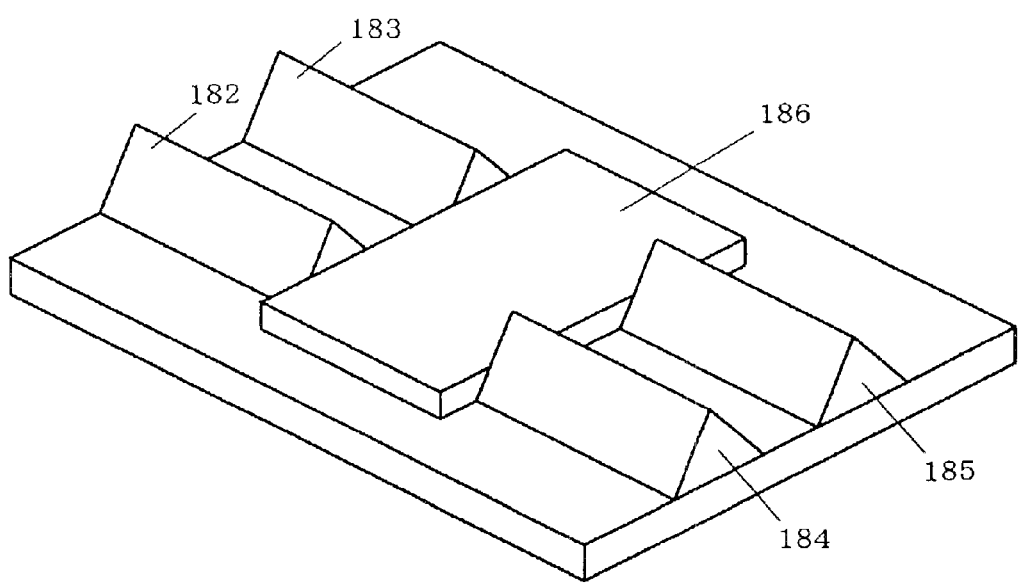
FIG. 18 is a perspective view illustrating a die used for molding the optical package substrate according to the ninth embodiment.

A die used for molding the optical package substrate 171 includes protrusions 182 to 185 for molding the first to fourth guide grooves 172 to 175, and a protrusion 186 for molding the terrace 180, as illustrated in FIG. 18.

Figure 5B:
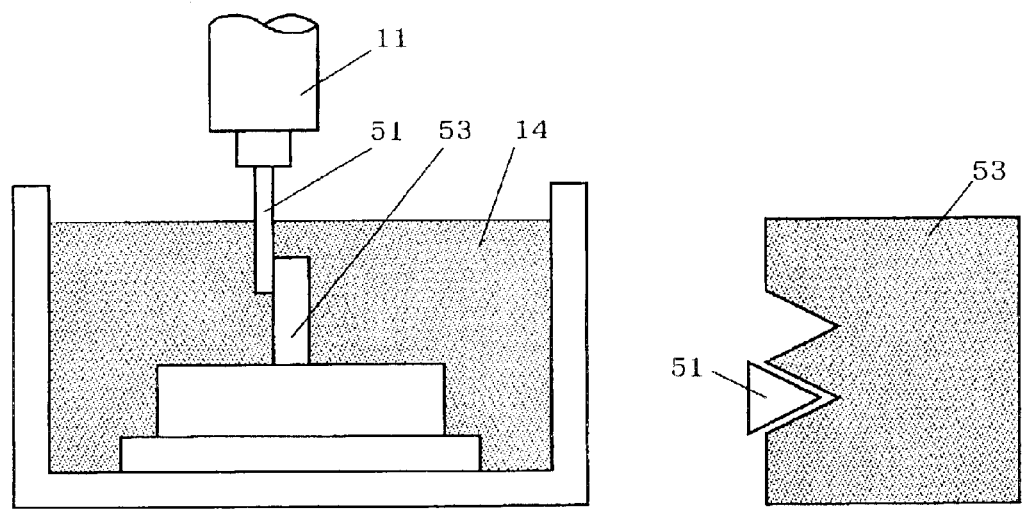
Figure 5C:
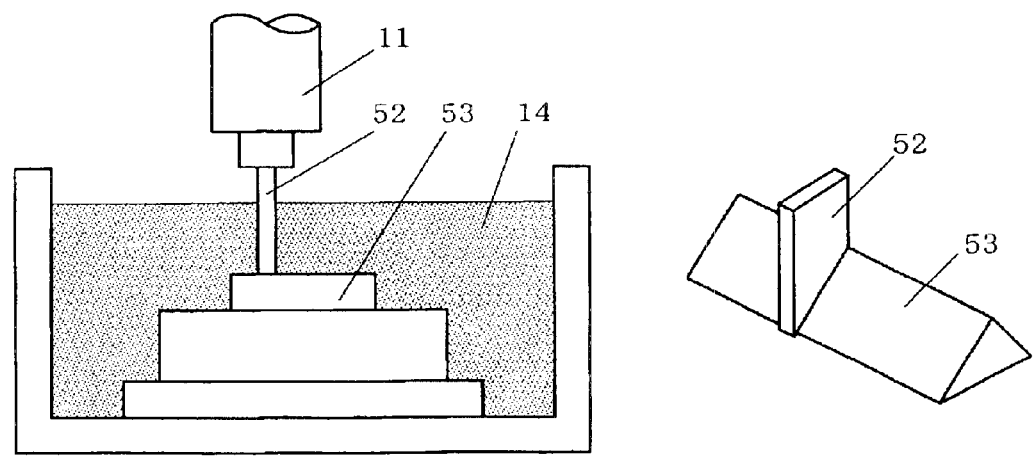
Figure 19:
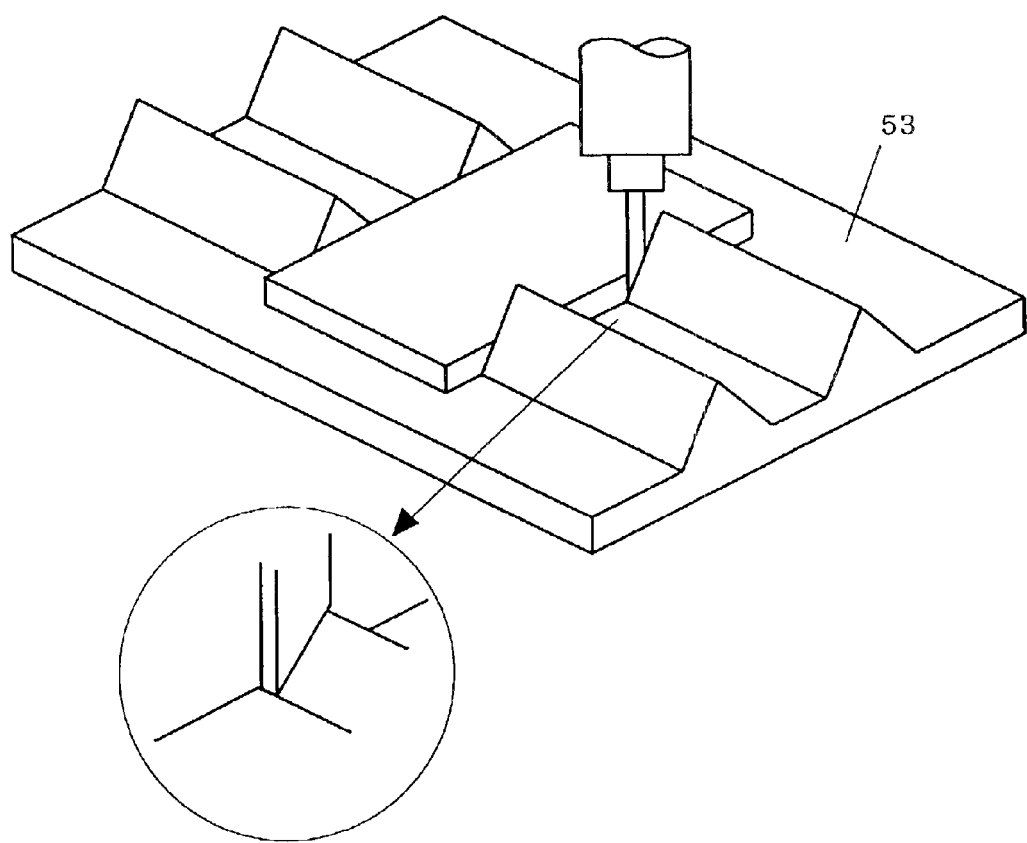
FIG. 19 illustrates how a die is produced using a tool electrode that has been finely processed by micro-discharge machining.

Triangular-prism-shaped protrusions 182 to 185 can be formed on the die by using a fine process method described above in the first embodiment with reference to FIG. 5A to FIG. 5C (FIG. 19).

Next, a common method for producing a quartz-based optical waveguide substrate will be described with reference to FIG. 20. First, a silicon substrate 201 is provided, and a lower cladding layer 202 is deposited on the silicon substrate 201 by performing a CVD method or a flame hydrolysis deposition method ((a) and (b) in FIG. 20). Then, a core layer 203 is deposited on the lower cladding layer 202 ((c) in FIG. 20). Then, the core layer 203 is patterned into a predetermined pattern by using photolithography and dry etching ((d) in FIG. 20). Finally, an upper cladding layer 204 is deposited on the lower cladding layer 202 so as to cover the core layer 203 ((e) in FIG. 20). Then, an optical waveguide substrate can be cutout from this chip. Such a cutting out process can be dicing, for example. A high outer-shape cutting precision with a tolerance of ±0.5 μm can be realized with a controlled blade shape and with a temperature control during the cutting process within a ±0.5° C. range.

A thickness of the core layer 203 suitable for connection to a single-mode optical fiber is about 8 μm, and light seeps into the cladding portion around the core by a distance of about 20 microns. Therefore, light can be propagated with no loss if a thickness of the lower cladding layer 202 and a thickness of the upper cladding layer 204 are 20 μm each or more. With a CVD method or a flame hydrolysis deposition method, the thickness of the cladding layers can be controlled within a tolerance of ±0.2 μm.

The core layer 203 is formed at a position and with a depth such that it is aligned with optical axes of the optical fibers 176 to 179 when the optical waveguide substrate 181 is affixed to the optical package substrate 171.

FIG. 21 illustrates a configuration of an optical device using the optical package substrate 171 illustrated in FIG. 17 with various components mounted thereon. The optical waveguide substrate 181 described above with reference to FIG. 20 is mounted on the terrace 180 of the optical package substrate 171, with the upper cladding layer 204 facing down, i.e., with the silicon substrate 201 facing up. The first to fourth optical fibers 176 to 179 are affixed to the first to fourth guide grooves 172 to 175, respectively, while being abutted against the optical waveguide substrate 181.

The upper cladding layer 204 is formed by using a method by which it is possible to control a thickness thereof with submicron-order precision, such as a CVD method or a flame hydrolysis deposition method. Therefore, if the terrace 180 is formed in the optical package substrate 171 while controlling a level difference with submicron-order precision, and the optical waveguide substrate 181 is placed in the terrace 180 with the upper cladding layer 204 facing down, it is possible to reliably align a height of a core of the optical waveguide with that of a core of the optical fiber within a tolerance of +1 μm. Horizontal core alignment can be ensured by forming the terrace 180 and the optical waveguide substrate 181 with the same size, whereby the optical waveguide core and the optical fiber core can be positioned without being shifted from each other with no active adjustment.

The optical fibers 176 to 179, the optical waveguide substrate 181, and the like, can be fixed easily by using a UV-curing adhesive having substantially the same refractive index as that of the optical fibers. Particularly, as for fixing of the optical waveguide substrate, it is only necessary to form the terrace 180 with a level difference that is determined while taking into consideration thickness of the adhesive.

The optical fiber guide grooves 172 to 175 preferably have a depth sufficient to stably hold the optical fibers. In order to stably hold a single-mode optical fiber, a guide groove preferably has a depth that is equal to or greater than a radius of the optical fiber, i.e., about 65 microns. The terrace 180 is preferably shallower than the guide grooves 172 to 175 because a thickness of 20 to 60 microns is sufficient for the upper cladding layer 204.

While the optical waveguide is formed by using a quartz-based optical waveguide substrate in the embodiment described above, the optical waveguide may alternatively be formed by using a resin-based optical waveguide substrate made of, for example, a polyimide material. In such a case, thickness can be controlled with submicron-order precision by forming the upper cladding layer using a spin coating method, or the like. Therefore, such an alternative may be used with an optical package substrate of the present embodiment.

Tenth Embodiment

FIG. 22 is a perspective view illustrating a shape of an optical package substrate 221 according to a tenth embodiment of the present invention. Referring to FIG. 22, first to third guide grooves 222 to 224 for positioning first to third optical fibers 225 to 227, respectively, and a terrace 228 for positioning an optical waveguide substrate 229 are formed in a surface of the optical package substrate 221. The guide grooves 222 to 224 and the terrace 228 adjoin together. The optical waveguide substrate 229 has a step 230 corresponding to a shape of the terrace 228, and a waveguide channel 231 corresponding to an optical waveguide core pattern is formed in a surface of the optical waveguide substrate 229. The waveguide channel 231 is formed at a position and with a depth such that it is aligned with optical axes of the optical fibers 225 to 227 when the optical waveguide substrate 229 is affixed to the optical package substrate 221.

In the ninth embodiment above, formation of an optical waveguide in the optical waveguide substrate 181 using a CVD method or a flame hydrolysis deposition method has been described. Alternatively, an optical waveguide can be formed by molding the waveguide channel 231 corresponding to the optical waveguide core pattern in the optical waveguide substrate 229, as illustrated in FIG. 13.

An optical device can be produced as follows using the optical package substrate 221, the optical waveguide substrate 229 and the first to third optical fibers 225 to 227 (FIG. 23).

First, the first to third optical fibers 225 to 227 are placed in the first to third guide grooves 222 to 224, respectively. Then, the optical waveguide substrate 229 is attached to the optical package substrate 221 using a UV-curing adhesive so that a waveguide channel 231 side thereof is fitted into the terrace 228. This affixes the optical fibers 225 to 227 to the respective guide grooves 222 to 224. Thus, a core of the optical waveguide and cores of the optical fibers are connected to each other with no active adjustment.

Eleventh Embodiment

FIG. 24 is a perspective view illustrating a shape of an optical package substrate 241 according to an eleventh embodiment of the present invention. Referring to FIG. 24, first to fourth guide grooves 242 to 245 for positioning first to fourth optical fibers 246 to 249, respectively, and a terrace 250 having a predetermined level difference are formed in a surface of the optical package substrate 241. First and second waveguide channels 251 and 252 corresponding to an optical waveguide core pattern are formed in a surface of the terrace 250. The guide grooves 242 to 245 and the terrace 250 adjoin together. The waveguide channels 251 and 252 are formed by cutting the terrace 250 so as to extend entirely across the terrace 250 each at a position and a depth such that they are aligned with optical axes of the optical fibers 246 to 249.

Figure 25A:
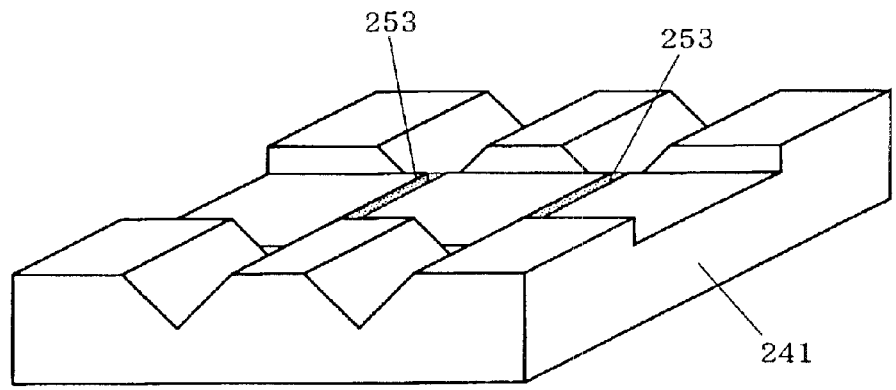
FIG. 25A and FIG. 25B are perspective views illustrating a configuration of an optical device using the optical package substrate according to the eleventh embodiment of the present invention.
Figure 25B:
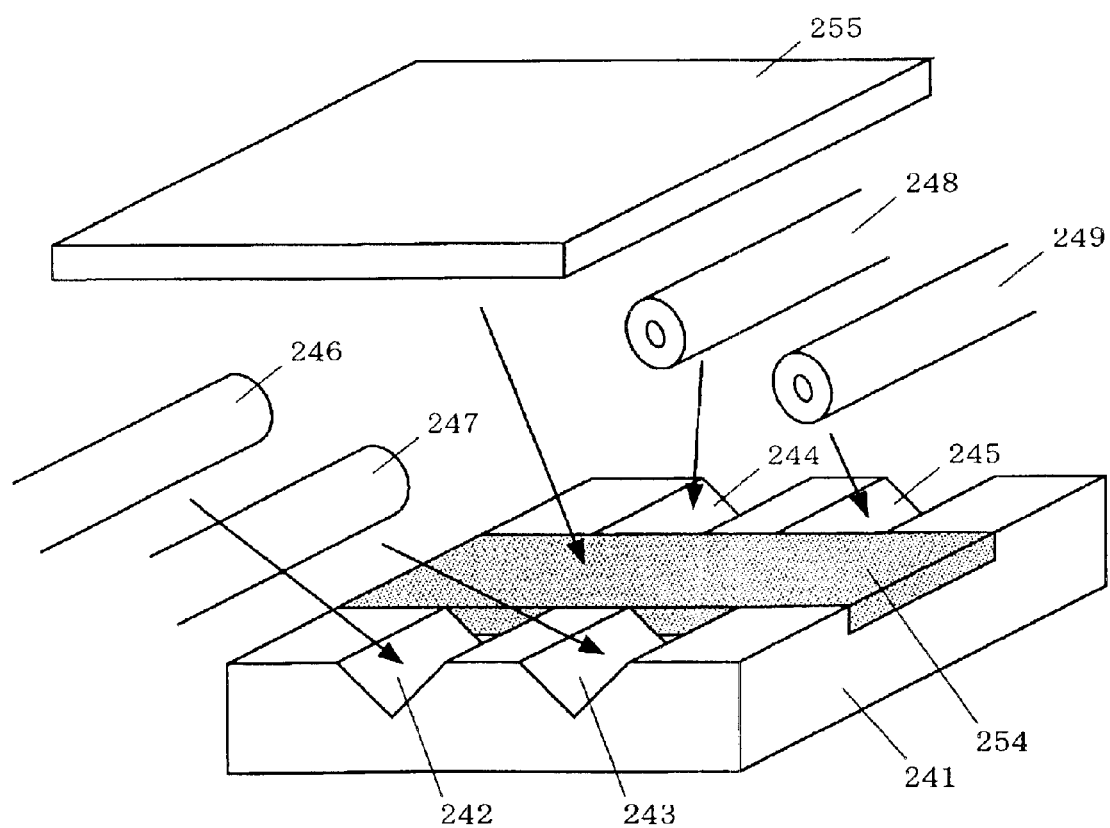
Figure 26:
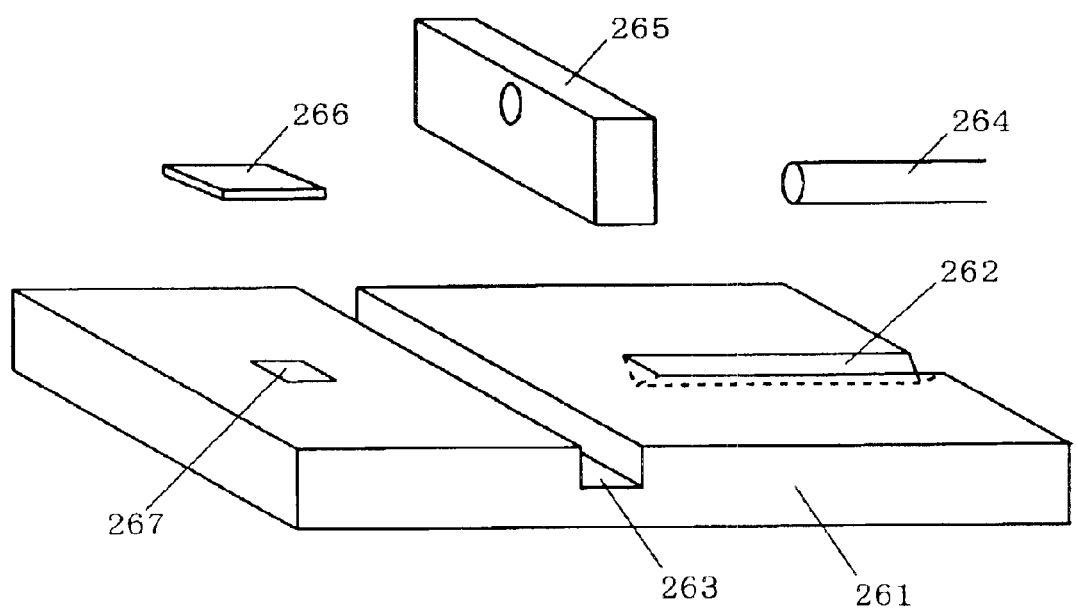
FIG. 26 is a perspective view illustrating a shape of a conventional optical package substrate using a silicon substrate as a base.
Figure 27:
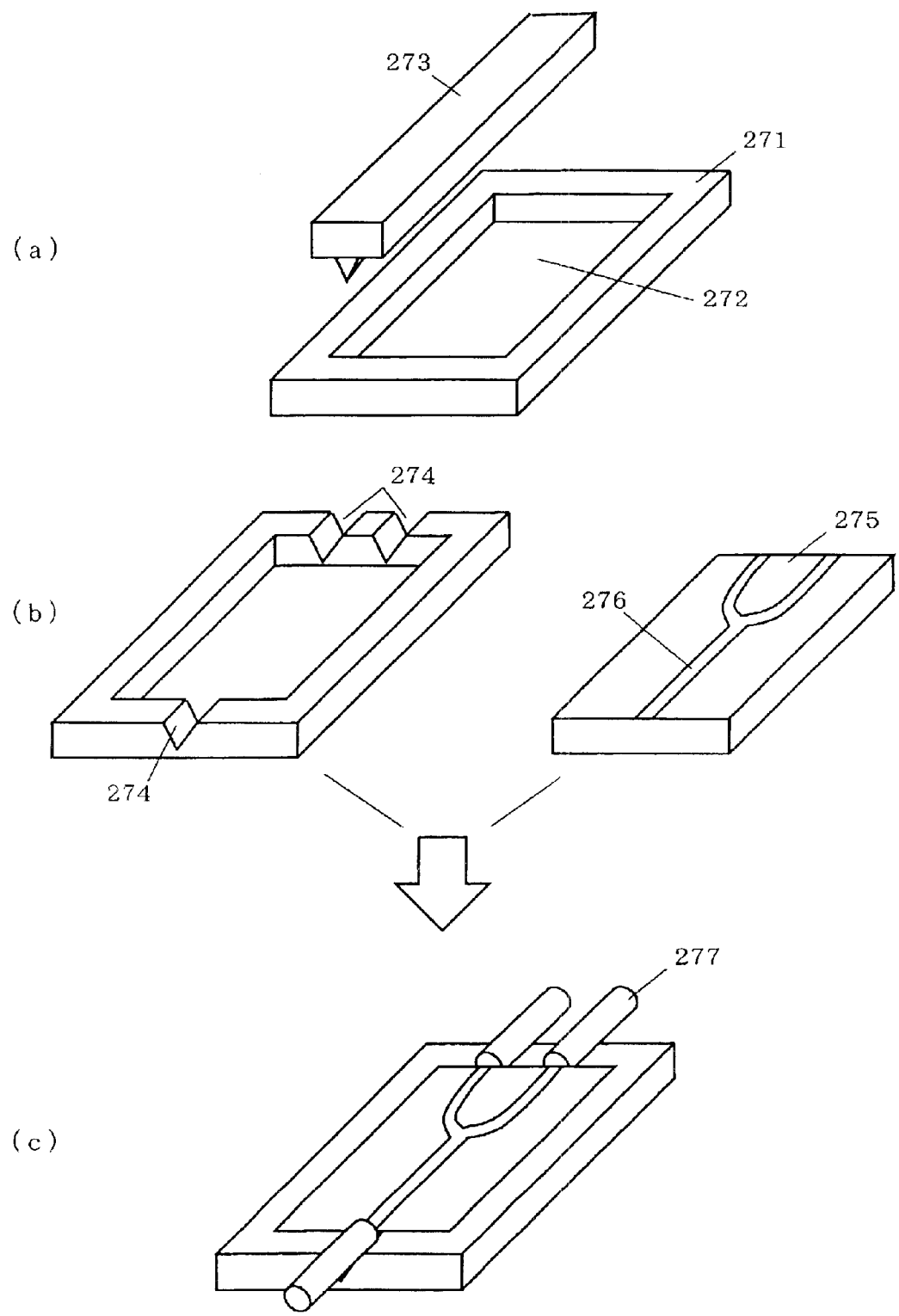
FIG. 27 illustrates a method for producing an optical device using a conventional passive alignment method.
Figure 28A:
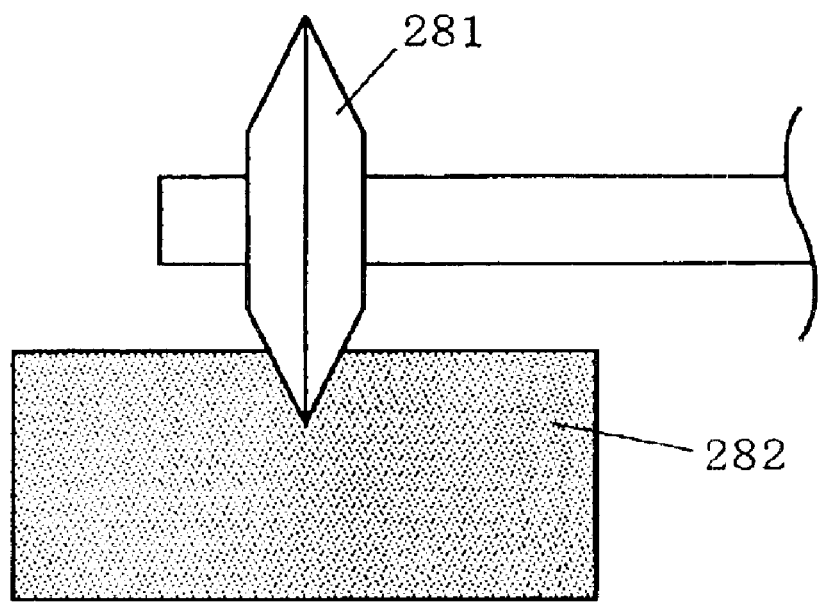
FIG. 28A and FIG. 28B illustrate a method for forming a common conventional die for molding a V groove.
Figure 28B:
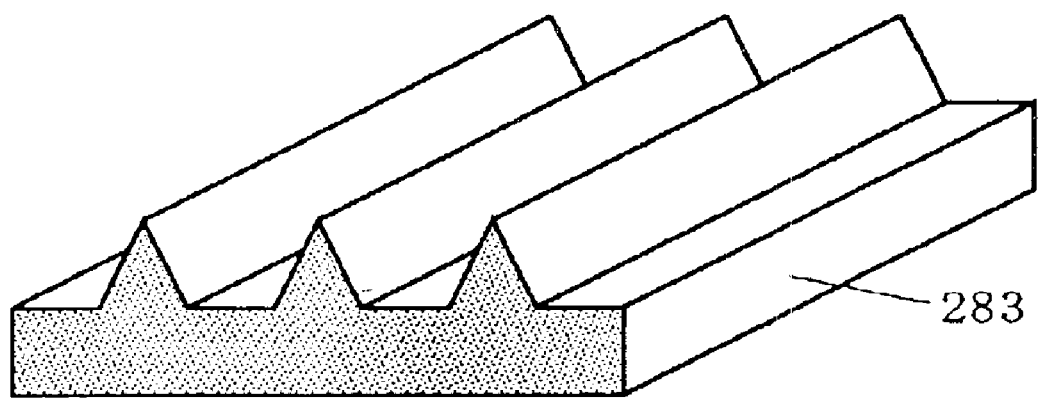

An optical device can be produced as follows using the optical package substrate 241 and the first to fourth optical fibers 246 to 249 (FIG. 25A and FIG. 25B).

First, the waveguide channels 251 and 252 are filled with a core material 253 having a higher refractive index than that of the optical package substrate 241 (FIG. 25A). For example, the waveguide channels 251 and 252 can be filled by applying a resin-based material using a spin coating method, or the like, or by applying a glass-based material using a thin film coating method. In either case, it is preferred in view of characteristics that excessive core material, which is not filled in the waveguide channels 251 and 252, is left in a thin layer. Then, the terrace 250 is filled with a UV-curing adhesive (or a thermosetting adhesive) 254 having substantially the same refractive index as that of the optical package substrate 241 (FIG. 25B). Then, the optical fibers 246 to 249 are placed in the guide grooves 242 to 245, respectively, and pressed down by a flat glass substrate 255 having substantially the same refractive index as that of the optical package substrate 241. Then, the UV-curing adhesive 254 is cured, whereby the optical package substrate 241 and the flat glass substrate 255 are adhered and fixed to each other. Thus, a core of the optical waveguide and cores of the optical fibers are connected to each other with no active adjustment.

As described above, with shapes of the optical package substrates according to the ninth to eleventh embodiments, the optical fibers and the optical waveguide substrate can be positioned and fixed with high precision simply by passively arranging these components. Thus, optical devices with these components mounted thereon can be mass-produced at low cost.

A cross-sectional shape of a guide groove does not need to be a V shape, but may alternatively be a rectangular shape, a semicircular shape, or the like.

A waveguide channel corresponding to an optical waveguide core pattern may be formed instead of an optical fiber guide groove. Thus, an optical waveguide on an optical package substrate and that on an optical waveguide substrate can be connected to each other.

While the invention has been described in detail, the foregoing description is in all aspects illustrative and not restrictive. It is understood that numerous other modifications and variations can be devised without departing from the scope of the invention.

What is claimed is:

1. An optical package substrate for mounting an optical component and/or an optical element thereon, comprising:
   an optical-fiber-positioning guide groove formed to a precision of sub-microns for fixing an optical axis of an optical fiber when mounted on the optical package substrate, said optical-fiber-positioning guide groove extending in a surface of the optical package substrate from a predetermined side surface thereof to a predetermined location thereon; and
   a lens-positioning guide groove formed to a precision of sub-microns for fixing an optical axis of a lens when mounted on the optical package substrate so that the optical axis of the lens is aligned with the optical axis of the optical fiber when fixed by said optical-fiber-positioning guide groove, said lens-positioning guide groove extending in the surface of the optical package substrate from another side surface thereof, opposite to the predetermined side surface, to the predetermined location.

2. The optical package substrate according to claim 1, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

3. The optical package substrate according to claim 2, wherein the optical package substrate comprises glass.

4. The optical package substrate according to claim 1, wherein the optical package substrate comprises glass.

5. An optical package substrate for mounting an optical component and/or an element thereon, comprising:
   an optical-fiber-positioning guide groove formed to a precision of sub-microns for fixing an optical axis of an optical fiber when mounted on the optical package substrate, said optical-fiber-positioning guide groove extending in a surface of the optical package substrate from a predetermined side surface thereof to a predetermined location thereon; and
   a lens-positioning guide depression, in the surface of the optical package substrate, formed to a precision of sub-microns for fixing an optical axis of a lens when mounted on the optical package substrate so that the optical axis of the lens is aligned with the optical axis of the optical fiber when fixed by said optical-fiber-positioning guide groove.

6. The optical package substrate according to claim 5, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

7. The optical package substrate according to claim 6, wherein the optical package substrate comprises glass.

8. The optical package substrate according to claim 5, wherein the optical package substrate comprises glass.

9. An optical package substrate for mounting an optical component and/or an optical element thereon, comprising:
   an optical-fiber-positioning guide groove formed to a precision of sub-microns for fixing an optical axis of an optical fiber when mounted on the optical package substrate, said optical-fiber-positioning guide groove extending in a surface of the optical package substrate from a predetermined side surface thereof to a predetermined location thereon; and
   an optical-component-positioning guide depression formed to a precision of sub-microns for fixing an optical axis of an optical component when mounted on the optical package substrate so that the optical axis of the optical component is aligned with the optical axis of the optical fiber when fixed by said optical-fiber-positioning guide groove, said optical-component-positioning guide depression extending in the surface of the optical package substrate in a direction perpendicular to the optical axis of the optical fiber when fixed by said optical-fiber-positioning guide groove.

10. The optical package substrate according to claim 9, further comprising a stage, on the surface of the optical package substrate, formed to a precision of sub-microns for positioning a light receiving/emitting element so that an optical axis of the light receiving/emitting element is aligned with the optical axis of the optical fiber when fixed by said optical-fiber-positioning guide groove and the optical axis of the optical component when fixed by said optical-component-positioning guide depression.

11. The optical package substrate according to claim 9, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool,
with at least one of the die and the fine-grinding tool being obtained by performing micro-discharge machining with a precision of sub-microns.

12. The optical package substrate according to claim 11, wherein the optical package substrate comprises glass.

13. The optical package substrate according to claim 9, wherein the optical package substrate comprises glass.

14. An optical package substrate for mounting an optical component and/or an optical element thereon, comprising:
an optical-fiber-positioning guide groove formed to a precision of sub-microns for fixing an optical axis of an optical fiber when mounted on the optical package substrate, said optical-fiber-positioning guide groove extending in a surface of the optical package substrate from a predetermined side surface thereof to a predetermined location thereon;
an optical-component-positioning guide depression formed to a precision of sub-microns for fixing an optical axis of an optical component when mounted on the optical package substrate so that the optical axis of the optical component is aligned with the optical axis of the optical fiber when fixed by said optical-fiber-positioning guide groove, said optical-component-positioning guide depression extending in the surface of the optical package substrate in a direction perpendicular to the optical axis of the optical fiber when fixed by said optical-fiber-positioning guide groove; and
a lens-positioning guide groove, in the surface of the optical package substrate, formed to a precision of sub-microns for fixing an optical axis of a lens when mounted on the optical package substrate so that the optical axis of the lens is aligned with the optical axis of the optical fiber when fixed by said optical-fiber-positioning guide groove and the optical axis of the optical component when fixed by said second optical-component-positioning guide depression.

15. The optical package substrate according to claim 14, further comprising a stage, on the surface of the optical package substrate, formed to a precision sub-microns for positioning a light receiving/emitting element so that an optical axis of the light receiving/emitting element is aligned with the optical axis of the lens when fixed by said lens-positioning guide groove, the optical axis of the optical fiber when fixed by said optical-fiber-positioning guide groove, and the optical axis of the optical component when fixed by said optical-component-positioning guide depression.

16. The optical package substrate according to claim 14, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool,
with at least one of the die and the fine-grinding tool being obtained by performing micro-discharge machining with a precision of sub-microns.

17. The optical package substrate according to claim 16, wherein the optical package substrate comprises glass.

18. The optical package substrate according to claim 14, wherein the optical package substrate comprises glass.

19. An optical package substrate for mounting an optical component and/or an optical element thereon, comprising:
a first optical-fiber-positioning guide groove formed to a precision of sub-microns for fixing an optical axis of a first optical fiber when mounted on the optical package substrate, said first optical-fiber-positioning guide groove extending in a surface of the optical package substrate from a predetermined side surface thereof to a predetermined location thereon;
a second optical-fiber-positioning guide groove formed to a precision of sub-microns for fixing an optical axis of a second optical fiber when mounted on the optical package substrate so that the optical axis of the second optical fiber is aligned with the optical axis of the first optical fiber when fixed by said first optical-fiber-positioning guide groove, said second optical-fiber-positioning guide groove extending in the surface of the optical package substrate from another side surface thereof, opposite to the predetermined side surface, to the predetermined location;
a third optical-fiber-positioning guide groove formed to a precision of sub-microns for fixing an optical axis of a third optical fiber when mounted on the optical package substrate, said third optical-fiber-positioning guide groove extending in the surface of the optical package substrate parallel to said first and second optical-fiber-positioning guide grooves; and
an optical-component-positioning guide depression formed to a precision of sub-microns for fixing an optical axis of an optical component when mounted on the optical package substrate so that the optical axis of the optical component is aligned with the optical axis of the first optical fiber when fixed by said first optical-fiber-positioning guide groove and the optical axis of the second optical fiber when fixed by said second optical-fiber-positioning guide groove, said optical-component-positioning guide depression extending in the surface of the optical package substrate between said first and second optical-fiber-positioning guide grooves in a direction perpendicular to the optical axes of the first and second optical fibers when held by said first and second optical-fiber-positioning guide grooves, respectively.

20. The optical package substrate according to claim 19, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool,
with at least one of the die and the fine-grinding tool being obtained by performing micro-discharge machining with a precision of sub-microns.

21. The optical package substrate according to claim 20, wherein the optical package substrate comprises glass.

22. The optical package substrate according to claim 19, wherein the optical package substrate comprises glass.

23. An optical package substrate for mounting an optical component and/or an optical element thereon, comprising:
a waveguide groove formed to a precision of sub-microns and corresponding to a predetermined optical waveguide core pattern, said waveguide groove extending in a surface of the optical package substrate from a predetermined side surface thereof to a predetermined location thereon; and
a lens-positioning guide groove formed to a precision of sub-microns for fixing an optical axis of a lens when mounted on the optical package substrate so that the optical axis of the lens is aligned with an optical axis of an optical waveguide when in said waveguide groove, said lens-positioning guide groove extending in the surface of the optical package substrate from another side surface thereof, opposite to the predetermined side surface, to the predetermined location.

24. The optical package substrate according to claim 23, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

25. The optical package substrate according to claim 24, wherein the optical package substrate comprises glass.

26. The optical package substrate according to claim 23, wherein the optical package substrate comprises glass.

27. An optical package substrate for mounting an optical component and/or an optical element thereon, comprising:

a waveguide groove formed to a precision of sub-microns and corresponding to a predetermined optical waveguide core pattern, said waveguide groove extending in a surface of the optical package substrate from a predetermined side surface thereof to a predetermined location thereon; and an optical-component-positioning guide depression formed to a precision of sub-microns for fixing an optical axis of an optical component when mounted on the optical package substrate so that the optical axis of the optical component is aligned with an optical axis of an optical fiber when on the optical package substrate, said optical-component-positioning guide depression extending in the surface of the optical package substrate in a direction perpendicular to an optical axis of an optical waveguide when in said waveguide groove.

28. The optical package substrate according to claim 27, further comprising a stage, on the surface of the optical package substrate, formed to a precision of sub-microns for positioning a light receiving/emitting element so that an optical axis of the light receiving/emitting element is aligned with the optical axis of the optical waveguide when in said waveguide groove and the optical axis of the optical component when fixed by said optical-component-positioning guide depression.

29. The optical package substrate according to claim 27, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

30. The optical package substrate according to claim 29, wherein the optical package substrate comprises glass.

31. The optical package substrate according to claim 27, wherein the optical package substrate comprises glass.

32. An optical package substrate for mounting an optical component and/or an optical element thereon, comprising:

a waveguide groove, in a surface of the optical package substrate, formed to a precision of sub-microns and corresponding to a predetermined optical waveguide core pattern;

an optical-component-positioning guide depression formed to a precision of sub-microns for fixing an optical axis of an optical component when mounted on the optical package substrate so that the optical axis of the optical component is aligned with an optical axis of an optical waveguide when in said waveguide groove, said optical-component-positioning guide depression extending in the surface of the optical package substrate in a direction perpendicular to the optical axis of the optical waveguide when in said waveguide groove;

a lens-positioning guide groove, in the surface of the optical package substrate, formed to a precision of sub-microns for fixing an optical axis of a lens when mounted on the optical package substrate so that the optical axis of the lens is aligned with the optical axis of the optical waveguide when in said waveguide groove;

a first stage, on the surface of the optical package substrate, formed to a precision of sub-microns for positioning a light emitting element so that an optical axis of the light emitting element is aligned with the optical axis of the optical waveguide when in said waveguide groove; and a second stage, on the surface of the optical package substrate, formed to a precision of sub-microns for positioning a light receiving element so that an optical axis of the light receiving element is aligned with an optical axis of the optical waveguide when in said waveguide groove.

33. The optical package substrate according to claim 32, further comprising an optical-fiber-positioning guide groove, in the surface of the optical package substrate, formed to a precision of sub-microns for fixing an optical axis of an optical fiber when mounted on the optical package substrate so that the optical axis of the optical fiber is aligned with an optical axis of the optical waveguide when in said waveguide groove.

34. The optical package substrate according to claim 32, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

35. The optical package substrate according to claim 34, wherein the optical package substrate comprises glass.

36. The optical package substrate according to claim 32, wherein the optical package substrate comprises glass.

37. An optical package substrate for mounting an optical component and/or an optical element thereon, comprising:

at least one optical-fiber-positioning guide groove formed to a precision of sub-microns for fixing an optical axis of at least one optical fiber when mounted on the optical package substrate, said at least one optical-fiber-positioning guide groove extending in a surface of the optical package substrate from a predetermined side surface thereof to a predetermined location thereon; and a substrate-positioning depression, in the surface of the optical package substrate, formed to a precision of sub-microns for fixing an optical waveguide substrate when mounted on the optical package substrate so that an optical axis of an optical waveguide when in the optical waveguide substrate is aligned with the optical axis of the at least one optical fiber when fixed by said at least one optical-fiber-positioning guide groove, said substrate-positioning depression adjoining said at least one optical-fiber-positioning guide groove at the predetermined location.

38. The optical package substrate according to claim 37, wherein the optical package substrate is molded by pressing a die against a substrate material, softened by being heated to a high temperature, so as to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

39. The optical package substrate according to claim 38, wherein the optical package substrate comprises glass.

40. The optical package substrate according to claim 37, wherein the optical package substrate comprises glass.

41. An optical package substrate for mounting an optical component and/or an optical element thereon, comprising:

at least one optical-fiber-positioning guide groove formed to a precision of sub-microns for fixing an optical axis of at least one optical fiber when mounted on the optical package substrate, said at least one optical-fiber-positioning guide groove extending in a surface of the optical package substrate from a predetermined side surface thereof to a predetermined location thereon;

a depression in the surface of the optical package substrate, formed to a precision sub-microns, said depression adjoining said at least one optical-fiber-positioning guide section at the predetermined location; and a waveguide groove corresponding to an optical waveguide core pattern, said waveguide groove being formed to a precision of sub-microns on a surface defining said depression so as to be aligned with the optical axis of the at least one optical fiber when fixed by said at least one optical-fiber-positioning guide groove.

42. The optical package substrate according to claim 41, wherein said at least one optical-fiber-positioning guide groove and said depression of the optical package substrate are formed by pressing a die against a substrate material, softened by being heated to a high temperature, so as to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

43. The optical package substrate according to claim 42, wherein the optical package substrate comprises glass.

44. The optical package substrate according to claim 41, wherein the optical package substrate comprises glass.

45. An optical package substrate for mounting an optical component and/or an optical element thereon, comprising:

at least one waveguide groove formed to a precision of sub-microns and corresponding to a predetermined optical waveguide core pattern, said at least one waveguide groove extending in a surface of the optical package substrate from a predetermined side surface thereof to a predetermined location thereon; and a substrate-positioning depression, in the surface of the optical package substrate, formed to a precision of sub-microns for fixing an optical axis of an optical waveguide when in an optical waveguide substrate mounted within said depression so that the optical axis of the optical waveguide is aligned with an optical axis of an optical waveguide when in said at least one waveguide groove, said substrate-positioning depression adjoining said at least one waveguide groove at the predetermined location.

46. The optical package substrate according to claim 45, wherein the optical package substrate is molded by pressing a die against a substrate material, softened by being heated to a high temperature, to transcribe an inverted pattern of the die onto the substrate material, the die having been obtained by using a normal-grinding tool and an arbitrary fine-grinding tool, with at least one of the die and the fine-grinding tool being obtained by performing micro-discharge machining with a precision of sub-microns.

47. The optical package substrate according to claim 46, wherein the optical package substrate comprises glass.

48. The optical package substrate according to claim 45, wherein the optical package substrate comprises glass.

* * * * *

UNITED STATES PATENT AND TRADEMARK OFFICE
CERTIFICATE OF CORRECTION

PATENT NO. : 6,904,190 B2
DATED : June 7, 2005
INVENTOR(S) : Tsuguhiro Korenaga et al.

It is certified that error appears in the above-identified patent and that said Letters Patent is hereby corrected as shown below:

Column 26,
Line 9, insert -- optical -- after "an".

Signed and Sealed this

Eighteenth Day of October, 2005

JON W. DUDAS
*Director of the United States Patent and Trademark Office*